(12) United States Patent
Teys et al.

(10) Patent No.: US 8,091,242 B2
(45) Date of Patent: Jan. 10, 2012

(54) DISPENSING UTENSIL

(75) Inventors: Bradley Donald Teys, Shelly Beach (AU); Glenn Bevan, Woolloongabba (AU); Kevin James Mobbs, Brighton (AU)

(73) Assignee: Sands Innovations Pty Ltd, Brisbane (AU)

( * ) Notice: Subject to any disclaimer, the term of this patent is extended or adjusted under 35 U.S.C. 154(b) by 727 days.

(21) Appl. No.: 11/771,372

(22) Filed: Jun. 29, 2007

(65) Prior Publication Data

US 2008/0072432 A1     Mar. 27, 2008

Related U.S. Application Data

(63) Continuation-in-part of application No. PCT/AU2004/001818, filed on Dec. 30, 2004.

(51) Int. Cl.
*A47J 43/28* (2006.01)

(52) U.S. Cl. ............... 30/324; 206/532; 7/595

(58) Field of Classification Search ............ 30/322–328; 206/461–471, 207–209.1, 528–540; D9/415; D7/300, 300.2, 305, 595
See application file for complete search history.

(56) References Cited

U.S. PATENT DOCUMENTS

| 1,000,178 | A |   | 8/1911  | Kahl    |         |
|-----------|---|---|---------|---------|---------|
| 1,372,325 | A |   | 3/1921  | Willemin|         |
| 1,754,973 | A | * | 4/1930  | Walch   | 30/125  |
| 2,654,252 | A |   | 10/1953 | Davis   |         |
| 2,837,822 | A |   | 6/1958  | Wille   |         |
| 3,075,639 | A | * | 1/1963  | Lingley | 206/366 |
| 3,116,152 | A |   | 12/1963 | Smith   |         |
| 3,133,679 | A |   | 5/1964  | Brown   |         |
| 3,154,418 | A |   | 10/1964 | Lovell  |         |
| D209,953  | S |   | 1/1968  | Stehl   |         |
| 3,410,457 | A | * | 11/1968 | Brown   | 222/191 |
| 3,421,654 | A |   | 1/1969  | Hexel   |         |
| 3,428,460 | A |   | 2/1969  | Ely     |         |
| D216,306  | S |   | 12/1969 | Dutch   |         |
| 3,521,805 | A |   | 7/1970  | Ward    |         |
| 3,648,369 | A |   | 3/1972  | Frodsham|         |
| 3,741,384 | A |   | 6/1973  | Cloud   |         |

(Continued)

FOREIGN PATENT DOCUMENTS

AU     63787/98     11/1998

(Continued)

OTHER PUBLICATIONS

European Search Report dated Aug. 13, 2009 issued in corresponding EP Application No. 0480211.0.

(Continued)

*Primary Examiner* — Sean Michalski
(74) *Attorney, Agent, or Firm* — Fitch, Even, Tabin & Flannery

(57) ABSTRACT

A dispensing utensil 10 comprising: a handle portion 11 having a first end portion and a second end portion and a frangible connection intermediate the first and second end portions; an implement portion 12; a cavity 15 for storing dispensable contents, the cavity 15 defined by a first wall means 13, 14 and a second wall means 19 closing the cavity 15; characterized in that a first portion 20 of the first wall means 13, 14 is openable about a hinge formed by the second wall means 19, thereby allowing the contents to be dispensed.

18 Claims, 31 Drawing Sheets

U.S. PATENT DOCUMENTS

| | | | |
|---|---|---|---|
| 3,891,331 A * | 6/1975 | Avery | 401/132 |
| 3,911,578 A | 10/1975 | Ushkow et al. | |
| 3,946,652 A | 3/1976 | Gorin | |
| 3,986,640 A | 10/1976 | Redmond | |
| 4,106,621 A * | 8/1978 | Sorenson | 206/365 |
| 4,231,496 A | 11/1980 | Gilson | |
| D259,533 S | 6/1981 | Frodsham | |
| 4,275,646 A | 6/1981 | Barna | |
| 4,277,194 A | 7/1981 | Smith | |
| D263,074 S | 2/1982 | Mason | |
| 4,317,284 A | 3/1982 | Prindle | |
| 4,338,338 A | 7/1982 | Popkes | |
| 4,387,809 A | 6/1983 | Botzler | |
| D275,517 S | 9/1984 | Hamilton et al. | |
| 4,493,574 A | 1/1985 | Redmond et al. | |
| D281,813 S | 12/1985 | Holewinski et al. | |
| 4,580,587 A | 4/1986 | Rittich et al. | |
| 4,611,715 A | 9/1986 | Redmond | |
| 4,615,120 A | 10/1986 | Newman | |
| 4,655,627 A | 4/1987 | Bradley | |
| 4,724,982 A | 2/1988 | Redmond | |
| 4,830,222 A | 5/1989 | Read | |
| 4,841,637 A * | 6/1989 | Scholzen | 30/125 |
| 4,888,188 A | 12/1989 | Castner, Sr. et al. | |
| 4,891,232 A | 1/1990 | Dahl | |
| 4,922,611 A | 5/1990 | Levy | |
| 5,027,947 A | 7/1991 | Reighart | |
| 5,067,822 A | 11/1991 | Wirth et al. | |
| 5,105,603 A | 4/1992 | Natterer | |
| D327,013 S | 6/1992 | Reighart | |
| 5,119,560 A | 6/1992 | Noble | |
| 5,125,534 A | 6/1992 | Rose et al. | |
| RE34,087 E | 10/1992 | Redmond | |
| D330,481 S | 10/1992 | Green | |
| 5,154,318 A | 10/1992 | Lampard | |
| 5,158,192 A | 10/1992 | Lataix | |
| D334,058 S | 3/1993 | Noble | |
| 5,203,459 A | 4/1993 | Wade | |
| 5,215,221 A | 6/1993 | Dirksing | |
| 5,238,157 A | 8/1993 | Gentile | |
| 5,238,179 A | 8/1993 | Hart | |
| 5,240,415 A | 8/1993 | Haynie | |
| D340,408 S | 10/1993 | Hirsch | |
| 5,251,758 A | 10/1993 | Kolacek | |
| 5,277,103 A | 1/1994 | Cox | |
| D344,058 S | 2/1994 | Jones | |
| 5,305,928 A | 4/1994 | Verdaguer | |
| D347,277 S | 5/1994 | Snedden | |
| 5,308,008 A | 5/1994 | Ruegg | |
| 5,348,191 A | 9/1994 | Dekeyser | |
| 5,377,879 A | 1/1995 | Isaacs | |
| 5,392,945 A | 2/1995 | Syrek | |
| 5,395,031 A | 3/1995 | Redmond | |
| 5,398,908 A | 3/1995 | Kienle | |
| 5,408,804 A | 4/1995 | Schroder | |
| 5,409,125 A | 4/1995 | Kimber et al. | |
| D358,466 S | 5/1995 | Harris et al. | |
| 5,411,178 A | 5/1995 | Roders et al. | |
| 5,426,919 A | 6/1995 | Natterer et al. | |
| 5,431,357 A | 7/1995 | Ruegg | |
| 5,437,881 A | 8/1995 | Jeannin | |
| 5,440,976 A | 8/1995 | Giuliano et al. | |
| D362,304 S | 9/1995 | Wilson et al. | |
| 5,464,595 A | 11/1995 | Finnah | |
| 5,477,660 A | 12/1995 | Smith | |
| 5,491,895 A * | 2/1996 | Lee | 30/125 |
| 5,494,192 A | 2/1996 | Redmond | |
| 5,494,252 A | 2/1996 | Amit et al. | |
| 5,529,224 A | 6/1996 | Chan et al. | |
| D371,491 S | 7/1996 | Stein | |
| 5,553,805 A | 9/1996 | Ruegg | |
| D375,055 S | 10/1996 | Reed | |
| 5,564,569 A | 10/1996 | Kiefer | |
| D375,352 S | 11/1996 | Bologna | |
| D375,353 S | 11/1996 | Wolff | |
| 5,577,627 A | 11/1996 | Richie-Dubler | |
| 5,579,957 A | 12/1996 | Gentile et al. | |
| 5,582,330 A | 12/1996 | Iba | |
| RE35,437 E | 2/1997 | Ascone | |
| 5,676,244 A | 10/1997 | Green et al. | |
| 5,676,280 A | 10/1997 | Robinson | |
| 5,695,084 A | 12/1997 | Chmela et al. | |
| 5,705,212 A | 1/1998 | Atkinson | |
| 5,706,980 A | 1/1998 | Dickerson | |
| 5,792,496 A | 8/1998 | Fekete et al. | |
| D398,843 S | 9/1998 | Wiegner | |
| 5,826,737 A | 10/1998 | Zakensberg | |
| 5,827,535 A | 10/1998 | Stone | |
| 5,839,609 A | 11/1998 | Zakensberg | |
| D402,546 S | 12/1998 | Massing | |
| D403,512 S | 1/1999 | Hennings | |
| 5,873,167 A | 2/1999 | Mason | |
| 5,873,483 A | 2/1999 | Gortz et al. | |
| 5,875,914 A | 3/1999 | Nguyen et al. | |
| D407,640 S | 4/1999 | Nelson et al. | |
| D408,217 S | 4/1999 | LoGiudice | |
| D408,278 S | 4/1999 | Konop | |
| 5,944,516 A | 8/1999 | Deshaies | |
| 5,975,305 A | 11/1999 | Barger | |
| 5,979,657 A | 11/1999 | Bumbera | |
| 6,003,673 A | 12/1999 | Vieu | |
| 6,003,710 A | 12/1999 | Huang | |
| 6,006,505 A | 12/1999 | Natterer | |
| 6,007,246 A | 12/1999 | Kinigakis et al. | |
| D419,063 S | 1/2000 | Baker et al. | |
| 6,024,219 A | 2/2000 | Froehlich et al. | |
| 6,041,930 A | 3/2000 | Cockburn | |
| D422,851 S | 4/2000 | Joergensen | |
| D425,617 S | 5/2000 | Snedden | |
| 6,062,413 A | 5/2000 | Redmond | |
| D426,708 S | 6/2000 | Francis | |
| 6,070,723 A | 6/2000 | Lewis | |
| 6,085,497 A | 7/2000 | Natterer | |
| 6,085,942 A | 7/2000 | Redmond | |
| 6,105,259 A | 8/2000 | Meyers et al. | |
| 6,116,450 A | 9/2000 | Huang | |
| 6,153,232 A | 11/2000 | Holten et al. | |
| D435,665 S | 12/2000 | Ogle | |
| 6,159,513 A * | 12/2000 | Judlowe et al. | 426/115 |
| D438,125 S | 2/2001 | Kaposi et al. | |
| D440,810 S | 4/2001 | Olson | |
| 6,209,748 B1 | 4/2001 | Dunbar | |
| 6,213,662 B1 | 4/2001 | Aljanedi | |
| 6,241,124 B1 | 6/2001 | Hoyt | |
| 6,245,367 B1 | 6/2001 | Galomb | |
| 6,254,907 B1 | 7/2001 | Galomb | |
| 6,279,233 B1 * | 8/2001 | Cameron | 30/125 |
| D447,560 S | 9/2001 | Hellberg et al. | |
| 6,282,866 B1 | 9/2001 | Natterer et al. | |
| 6,286,731 B1 | 9/2001 | Lillelund et al. | |
| 6,287,612 B1 | 9/2001 | Mandava et al. | |
| 6,295,735 B1 | 10/2001 | Barger | |
| 6,299,012 B1 | 10/2001 | Redmond | |
| 6,311,837 B1 | 11/2001 | Blaustein et al. | |
| 6,328,928 B1 | 12/2001 | Schroeder et al. | |
| 6,336,310 B1 | 1/2002 | Redmond | |
| 6,341,472 B1 | 1/2002 | Schroeder | |
| 6,347,727 B1 | 2/2002 | Diaz | |
| 6,349,866 B1 | 2/2002 | Stewart et al. | |
| 6,357,626 B1 | 3/2002 | Zhang et al. | |
| D456,507 S | 4/2002 | LeMarr et al. | |
| 6,364,113 B1 | 4/2002 | Faasse, Jr. et al. | |
| 6,364,203 B2 | 4/2002 | Toussant et al. | |
| 6,364,519 B1 | 4/2002 | Hughes et al. | |
| 6,372,176 B1 | 4/2002 | Ekendahl et al. | |
| 6,390,358 B1 | 5/2002 | Stewart et al. | |
| 6,395,317 B1 | 5/2002 | Singh et al. | |
| D458,809 S | 6/2002 | Richardson et al. | |
| 6,412,653 B1 | 7/2002 | Waterhouse | |
| 6,415,939 B1 | 7/2002 | Redmond | |
| 6,457,612 B1 | 10/2002 | Zhang et al. | |
| 6,471,122 B1 | 10/2002 | Stewart et al. | |
| 6,472,007 B2 | 10/2002 | Bezek et al. | |
| D467,336 S | 12/2002 | Gilbard et al. | |
| D467,499 S | 12/2002 | Garza et al. | |
| 6,516,939 B1 | 2/2003 | Schmidt et al. | |
| D471,628 S | 3/2003 | Louviere | |

| | | |
|---|---|---|
| 6,536,974 B2 | 3/2003 | Redmond |
| 6,550,224 B2 | 4/2003 | Kleinschmidt |
| 6,558,150 B1 | 5/2003 | Karbach |
| 6,589,041 B2 | 7/2003 | Feil |
| 6,589,042 B2 | 7/2003 | Stammler et al. |
| 6,596,328 B1 | 7/2003 | Bezek et al. |
| D477,965 S | 8/2003 | Kortleven et al. |
| D479,674 S | 9/2003 | Freed |
| D480,318 S | 10/2003 | Settele |
| D482,578 S | 11/2003 | Kortleven et al. |
| 6,649,114 B2 | 11/2003 | Lochner et al. |
| 6,651,848 B1 | 11/2003 | Redmond |
| D482,939 S | 12/2003 | Lillelund et al. |
| D483,257 S | 12/2003 | Lim |
| D484,425 S | 12/2003 | Settele |
| 6,655,903 B2 | 12/2003 | Kohler |
| 6,662,454 B2 | 12/2003 | Harrold |
| 6,673,301 B2 | 1/2004 | Cargile et al. |
| 6,675,482 B1 | 1/2004 | Gilbert, Jr. et al. |
| 6,685,058 B2 | 2/2004 | Redmond |
| 6,688,469 B1 | 2/2004 | Barnes |
| 6,691,901 B2 | 2/2004 | Parve et al. |
| 6,692,212 B2 | 2/2004 | Trautwein et al. |
| D487,397 S | 3/2004 | Peghini |
| 6,698,165 B1 | 3/2004 | Natterer |
| 6,699,006 B2 | 3/2004 | Schlimgen et al. |
| 6,701,692 B1 | 3/2004 | Niehr |
| 6,706,297 B1 | 3/2004 | Toth et al. |
| 6,712,599 B2 | 3/2004 | Schlimgen et al. |
| D488,079 S | 4/2004 | Mastroianni |
| D488,394 S | 4/2004 | Overthun et al. |
| D489,820 S | 5/2004 | Masuda et al. |
| 6,736,379 B1 | 5/2004 | Wegner et al. |
| D492,407 S | 6/2004 | Masuda et al. |
| D494,676 S | 8/2004 | Dubniczki et al. |
| D494,877 S | 8/2004 | Kempe et al. |
| 6,769,558 B1 | 8/2004 | Bucholtz |
| 6,769,684 B2 | 8/2004 | Gandelheidt |
| 6,783,030 B2 | 8/2004 | Redmond |
| 6,802,423 B2 | 10/2004 | O'Brien |
| D500,850 S | 1/2005 | Clark et al. |
| 6,845,597 B2 | 1/2005 | Redmond |
| 6,848,339 B2 | 2/2005 | Hakim |
| 6,851,920 B2 | 2/2005 | Trautwein et al. |
| 6,860,405 B1 | 3/2005 | Poynter |
| 6,874,665 B2 | 4/2005 | Doherty et al. |
| 6,905,323 B2 | 6/2005 | Keller |
| 6,910,623 B2 | 6/2005 | Stewart et al. |
| 6,928,870 B1 | 8/2005 | Liebowitz |
| 6,942,097 B1 | 9/2005 | Stremple et al. |
| 6,953,420 B2 | 10/2005 | Karbach |
| 6,957,909 B1 | 10/2005 | Dingeldein et al. |
| D511,645 S | 11/2005 | Fort et al. |
| 7,005,109 B2 | 2/2006 | Husar |
| D517,207 S | 3/2006 | Poynter |
| 7,013,568 B2 | 3/2006 | Schmidt |
| 7,069,705 B2 | 7/2006 | Redmond |
| 7,121,409 B1 | 10/2006 | Hamilton et al. |
| D531,918 S | 11/2006 | Heiligenstein et al. |
| 7,140,863 B2 | 11/2006 | Koppenhofer |
| 7,143,910 B2 | 12/2006 | Redmond |
| D524,610 S | 1/2007 | Weinstein |
| D534,648 S | 1/2007 | Zahn et al. |
| 7,175,215 B2 * | 2/2007 | Harris .................... 294/1.1 |
| D539,420 S | 3/2007 | Zahn et al. |
| 7,198,161 B2 | 4/2007 | Bucholtz |
| 7,210,600 B1 | 5/2007 | Delio, Jr. |
| 7,219,816 B1 | 5/2007 | Xia et al. |
| 7,226,230 B2 | 6/2007 | Liberatore |
| D545,636 S | 7/2007 | Risden |
| D545,640 S | 7/2007 | Risden et al. |
| D547,134 S | 7/2007 | Everett et al. |
| D547,860 S | 7/2007 | Zahn et al. |
| 7,240,797 B1 | 7/2007 | Grossman |
| D548,834 S | 8/2007 | Hansen |
| 7,258,255 B2 | 8/2007 | Vogel et al. |
| D551,760 S | 9/2007 | Zahn et al. |
| D556,321 S | 11/2007 | Starnes |
| 7,290,380 B2 | 11/2007 | Natterer |
| 7,293,683 B2 | 11/2007 | Natterer |
| 7,299,947 B2 | 11/2007 | Lingenhoff |
| D560,442 S | 1/2008 | Teys et al. |
| D560,443 S | 1/2008 | Teys et al. |
| 7,314,196 B2 | 1/2008 | Gandelheidt et al. |
| 7,314,328 B2 | 1/2008 | Liberatore |
| 7,320,398 B2 | 1/2008 | Bertl et al. |
| 7,325,370 B2 | 2/2008 | Redmond |
| 7,325,703 B2 | 2/2008 | Gherdan et al. |
| 7,325,994 B2 | 2/2008 | Liberatore |
| D565,193 S | 3/2008 | Price |
| 7,347,680 B2 | 3/2008 | Hessenbruch |
| D567,004 S | 4/2008 | Bottega |
| 7,361,008 B2 | 4/2008 | Crepaz |
| 7,370,564 B2 | 5/2008 | Hennes |
| 7,374,046 B1 | 5/2008 | O'Brien |
| D570,164 S | 6/2008 | Teys et al. |
| D571,002 S | 6/2008 | Starnes |
| D572,089 S | 7/2008 | Teys et al. |
| D572,976 S | 7/2008 | Mansfield |
| 7,413,083 B2 | 8/2008 | Belfance et al. |
| 7,431,529 B1 | 10/2008 | Rushe et al. |
| D580,715 S | 11/2008 | Finell |
| 7,478,960 B2 | 1/2009 | Glover |
| 7,487,625 B2 | 2/2009 | Natterer et al. |
| 7,487,894 B2 | 2/2009 | Zahn et al. |
| 7,490,974 B2 | 2/2009 | Hennes |
| 7,503,604 B2 | 3/2009 | Raeder et al. |
| 7,506,762 B2 | 3/2009 | Nelson et al. |
| 7,513,397 B2 | 4/2009 | Zahn et al. |
| D592,826 S | 5/2009 | Lingenhoff |
| 7,540,291 B2 | 6/2009 | Gandelheidt |
| 7,562,796 B2 * | 7/2009 | Zahn et al. ................. 222/541.9 |
| 7,568,590 B1 | 8/2009 | Gross et al. |
| 7,600,358 B2 | 10/2009 | Natterer |
| D604,635 S | 11/2009 | Xu |
| 7,628,125 B2 | 12/2009 | Kaita et al. |
| 7,631,776 B2 | 12/2009 | Vovan et al. |
| 7,648,328 B2 | 1/2010 | Binder et al. |
| D609,362 S * | 2/2010 | Rannikko et al. ............ D24/224 |
| 7,669,597 B2 | 3/2010 | Sullivan et al. |
| 7,669,714 B1 | 3/2010 | Grossman |
| 7,690,883 B2 | 4/2010 | Huber et al. |
| 7,703,619 B2 | 4/2010 | Van Puijenbroek |
| 2001/0001470 A1 | 5/2001 | Toussant et al. |
| 2002/0104856 A1 | 8/2002 | Clark et al. |
| 2002/0180114 A1 | 12/2002 | Cargile et al. |
| 2003/0029868 A1 | 2/2003 | Davidov et al. |
| 2003/0066870 A1 | 4/2003 | Stewart |
| 2003/0183641 A1 | 10/2003 | Asbury |
| 2003/0222099 A1 | 12/2003 | Keller |
| 2004/0006874 A1 | 1/2004 | Kamm et al. |
| 2004/0074802 A1 | 4/2004 | Piliero et al. |
| 2004/0094548 A1 | 5/2004 | Laveault |
| 2004/0105715 A1 | 6/2004 | Spelman et al. |
| 2004/0187662 A1 * | 9/2004 | Ulmer et al. .................... 83/39 |
| 2005/0025561 A1 | 2/2005 | Larsen |
| 2005/0042019 A1 | 2/2005 | Gaynes et al. |
| 2005/0116482 A1 | 6/2005 | Harris |
| 2005/0218106 A1 | 10/2005 | Yui |
| 2005/0236442 A1 | 10/2005 | Kratzer |
| 2005/0249031 A1 | 11/2005 | Morgese et al. |
| 2005/0252351 A1 | 11/2005 | Natterer |
| 2006/0191805 A1 | 8/2006 | Vogel et al. |
| 2007/0012710 A1 | 1/2007 | Vovan |
| 2007/0045317 A1 | 3/2007 | Rosender et al. |
| 2007/0084064 A1 | 4/2007 | Fite et al. |
| 2007/0102308 A1 | 5/2007 | Tremblay et al. |
| 2007/0187277 A1 | 8/2007 | Furlong |
| 2007/0235104 A1 | 10/2007 | Lingenhoff |
| 2007/0267183 A1 | 11/2007 | Hennes |
| 2008/0002921 A1 | 1/2008 | Redmond |
| 2008/0034710 A1 | 2/2008 | Ehrmann |
| 2008/0040862 A1 | 2/2008 | Bravo |
| 2008/0072432 A1 | 3/2008 | Teys et al. |
| 2008/0072433 A1 | 3/2008 | Ohring et al. |
| 2008/0149523 A1 | 6/2008 | O'Brien |
| 2008/0152767 A1 | 6/2008 | Maisel |
| 2008/0191381 A1 | 8/2008 | Hennes |

| | | | | | | |
|---|---|---|---|---|---|---|
| 2008/0210716 | A1 | 9/2008 | Weyts | FR | 1418834 | 11/1965 |
| 2008/0278340 | A1 | 11/2008 | Jokele et al. | FR | 2063745 | 9/1971 |
| 2009/0000255 | A1 | 1/2009 | Dandl et al. | FR | 2622424 | 5/1989 |
| 2009/0025340 | A1 | 1/2009 | Natterer et al. | FR | 2680456 | 2/1993 |
| 2009/0050649 | A1 | 2/2009 | Rushe et al. | FR | 2697331 | 4/1994 |
| 2009/0057386 | A1 | 3/2009 | Redmond | GB | 1017425 | 1/1966 |
| 2009/0071099 | A1 | 3/2009 | Ehrmann et al. | GB | 2343440 | 5/2000 |
| 2009/0071100 | A1 | 3/2009 | Ehrmann et al. | GB | 2351272 | 12/2000 |
| 2009/0071107 | A1 | 3/2009 | Ehrmann et al. | GB | 2373710 | 10/2002 |
| 2009/0097949 | A1 | 4/2009 | Binder et al. | GB | 2375040 | 11/2002 |
| 2009/0152261 | A1 | 6/2009 | Capriotti | GB | 2382020 | 5/2003 |
| 2009/0173039 | A1 | 7/2009 | Slomski et al. | GB | 2383989 | 7/2003 |
| 2009/0173041 | A1 | 7/2009 | Moessnang | GB | 2401025 | 11/2004 |
| 2009/0173049 | A1 | 7/2009 | Ruzic et al. | GB | 2418193 | 3/2006 |
| 2009/0217532 | A1 | 9/2009 | Cantu | GB | 2454230 | 5/2009 |
| 2009/0217625 | A1 | 9/2009 | Moessnang | JP | 04082701 | 3/1992 |
| 2009/0218374 | A1 | 9/2009 | Liberatore | JP | 4122213 | 4/1992 |
| 2009/0241469 | A1 | 10/2009 | Moessnang et al. | JP | 7255581 | 10/1995 |
| 2009/0255218 | A1 | 10/2009 | Moessnang | JP | 9252911 | 9/1997 |
| 2009/0260319 | A1 | 10/2009 | Botzenhardt et al. | JP | 2000005024 | 1/2000 |
| 2009/0260320 | A1 | 10/2009 | Miller et al. | JP | 2000333811 | 12/2000 |
| 2009/0260325 | A1 | 10/2009 | Haering | JP | 2001299552 | 10/2001 |
| 2009/0260326 | A1 | 10/2009 | Grimm et al. | JP | 2005152558 | 6/2005 |
| 2009/0261230 | A1 | 10/2009 | Imhof | NL | 1036045 | 10/2009 |
| 2009/0266028 | A1 | 10/2009 | Zeller et al. | SI | 9400348 | 4/1996 |
| 2009/0288365 | A1 | 11/2009 | Negele | SI | 9600327 | 6/1998 |
| 2009/0294454 | A1 | 12/2009 | Harding | WO | 9630272 | 10/1996 |
| 2009/0314415 | A1 | 12/2009 | Gross et al. | WO | WO 97/03634 | 2/1997 |
| 2009/0314777 | A1 | 12/2009 | Gross et al. | WO | WO 97/06073 | 2/1997 |
| 2010/0024360 | A1 | 2/2010 | Ehrmann et al. | WO | 9713428 | 4/1997 |
| 2010/0024668 | A1 | 2/2010 | Huber et al. | WO | 9734816 | 9/1997 |
| 2010/0065567 | A1 | 3/2010 | Vovan | WO | W09808751 | 3/1998 |
| 2010/0065582 | A1 | 3/2010 | Nelson et al. | WO | 9819583 | 5/1998 |
| 2010/0095640 | A1 | 4/2010 | Grimm | WO | WO 98/19583 | 5/1998 |
| 2010/0107572 | A1 | 5/2010 | Slomp et al. | WO | WO 98/51259 | 11/1998 |
| 2010/0108680 | A1 | 5/2010 | Vovan et al. | WO | 9903441 | 1/1999 |
| 2010/0116772 | A1 | 5/2010 | Teys | WO | WO 99/09871 | 3/1999 |
| 2011/0024462 | A1 | 2/2011 | Teys | WO | 99/44482 | 9/1999 |
| | | | | WO | WO 99/61337 | 12/1999 |

FOREIGN PATENT DOCUMENTS

| | | | | | |
|---|---|---|---|---|---|
| AU | 1999 47456 | 2/2000 | WO | WO 01/00134 | 1/2001 |
| AU | 750188 | 5/2001 | WO | 0136293 | 5/2001 |
| AU | 764881 | 9/2003 | WO | 0170080 | 9/2001 |
| AU | 2004 100000 | 2/2004 | WO | 2002032782 | 4/2002 |
| AU | 200415919 | 6/2005 | WO | 03055435 | 7/2003 |
| AU | 200415920 | 6/2005 | WO | 03086900 | 10/2003 |
| BE | 1008054 | 1/1996 | WO | WO 2005/065498 | 7/2005 |
| CA | 2376147 | 4/2001 | WO | 2005116590 | 12/2005 |
| DE | 2124931 | 11/1972 | WO | WO 2005/116590 | 12/2005 |
| DE | 7523870 | 11/1976 | WO | 2006000376 | 1/2006 |
| DE | 19627243 | 1/1998 | WO | 2006051305 | 5/2006 |
| DE | 19904649 | 10/2000 | WO | 2006137674 | 12/2006 |
| DE | 7237741 | 10/2002 | WO | 2007082034 | 7/2007 |
| DE | 202004006760 | 9/2005 | WO | 2008092200 | 7/2008 |
| DE | 102004055796 | 5/2006 | WO | 2009006690 | 1/2009 |
| DE | 102005028618 | 12/2006 | WO | 2009047821 | 4/2009 |
| DE | 102007009457 | 8/2008 | WO | 2010/065980 | 6/2010 |
| EP | 0496587 | 7/1992 | | | |
| EP | 0778018 | 6/1997 | | | |
| EP | 0778018 | 11/1997 | | | |
| EP | 0937655 | 8/1998 | | | |
| EP | 1068850 | 10/2000 | | | |
| EP | 1121922 | 8/2001 | | | |

OTHER PUBLICATIONS

U.S. Appl. No. 12/795,220, filed Jun. 7, 2010, entitled Reclosable Container, 48 pages.

* cited by examiner

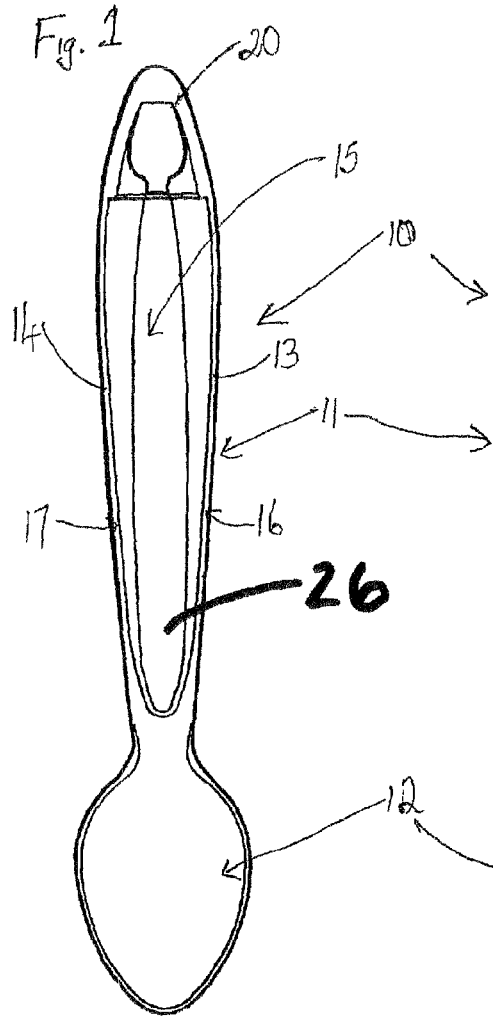
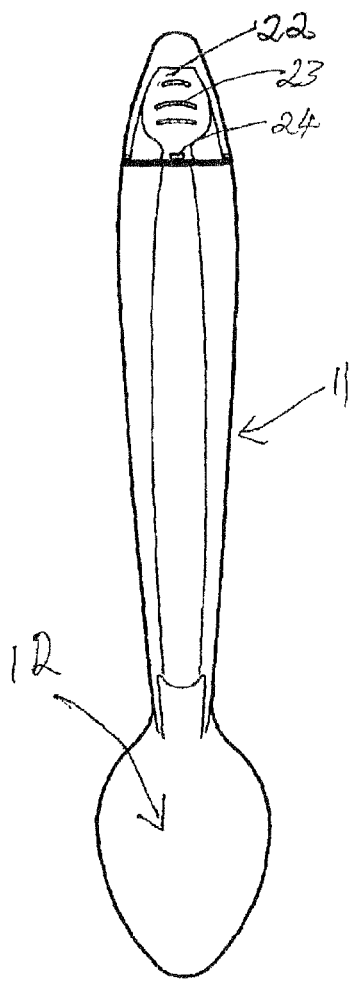

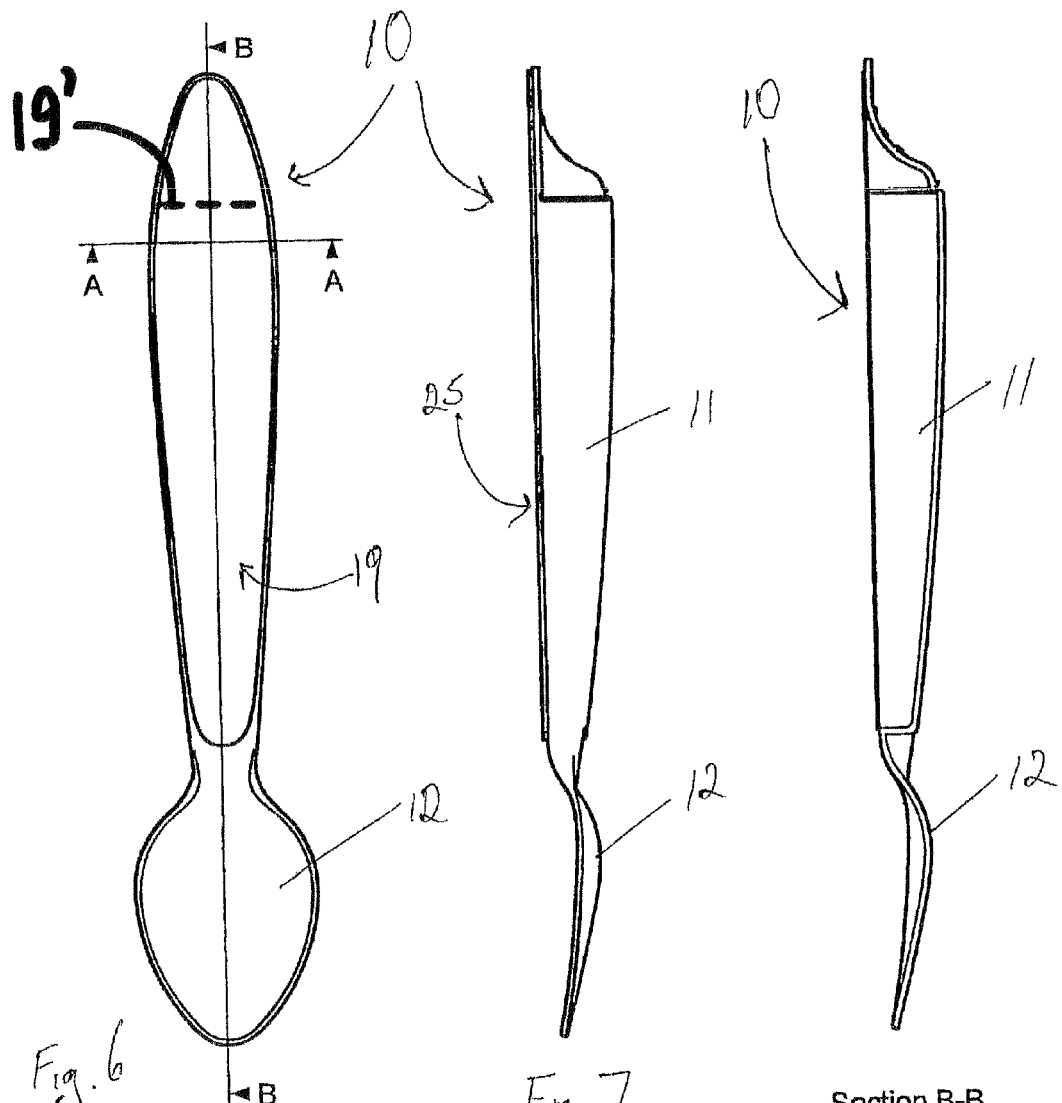
Fig. 6
Fig. 7
Section B-B
Fig. 8
Section A-A
Fig. 9

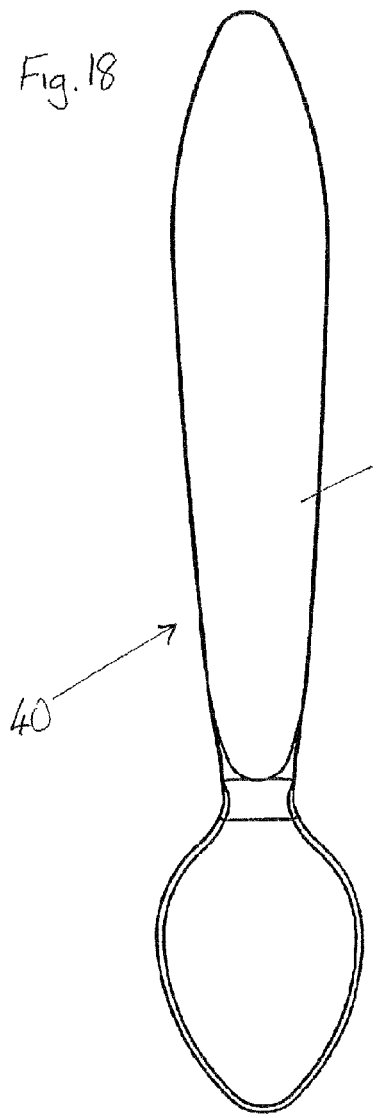
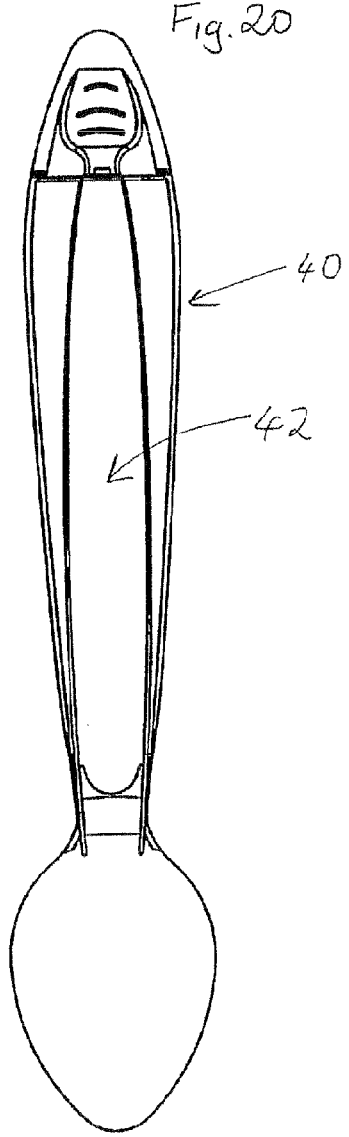

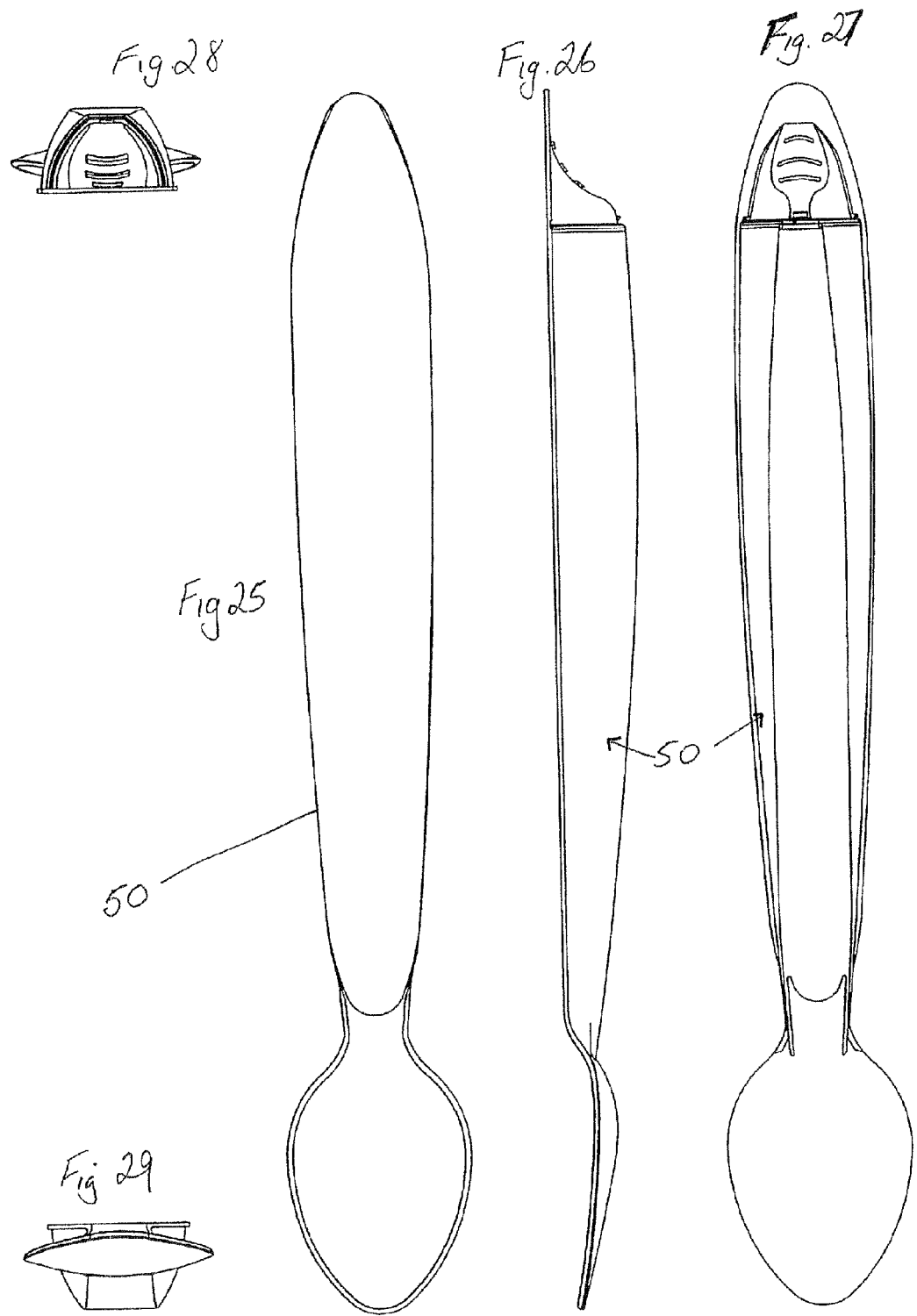

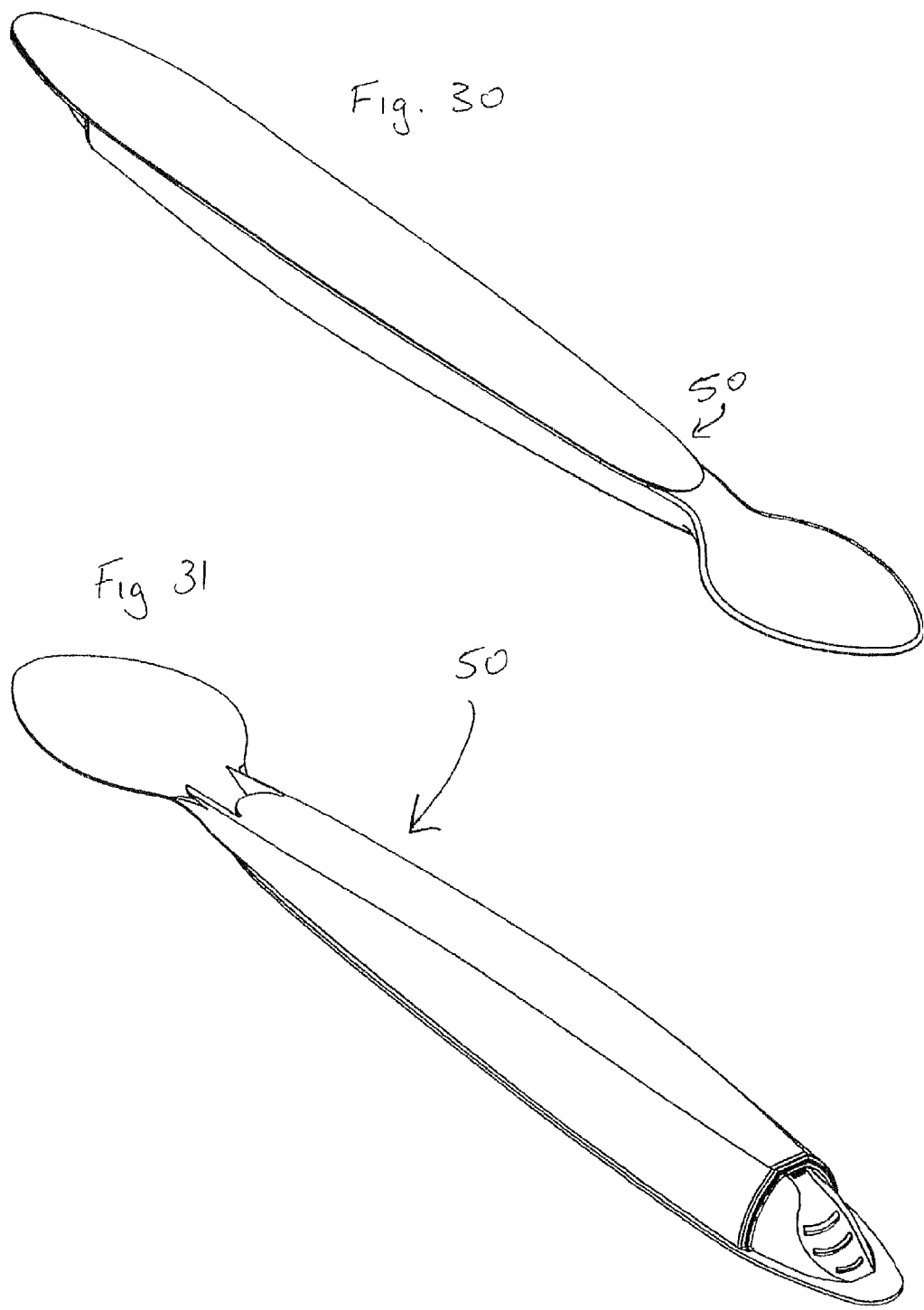

60

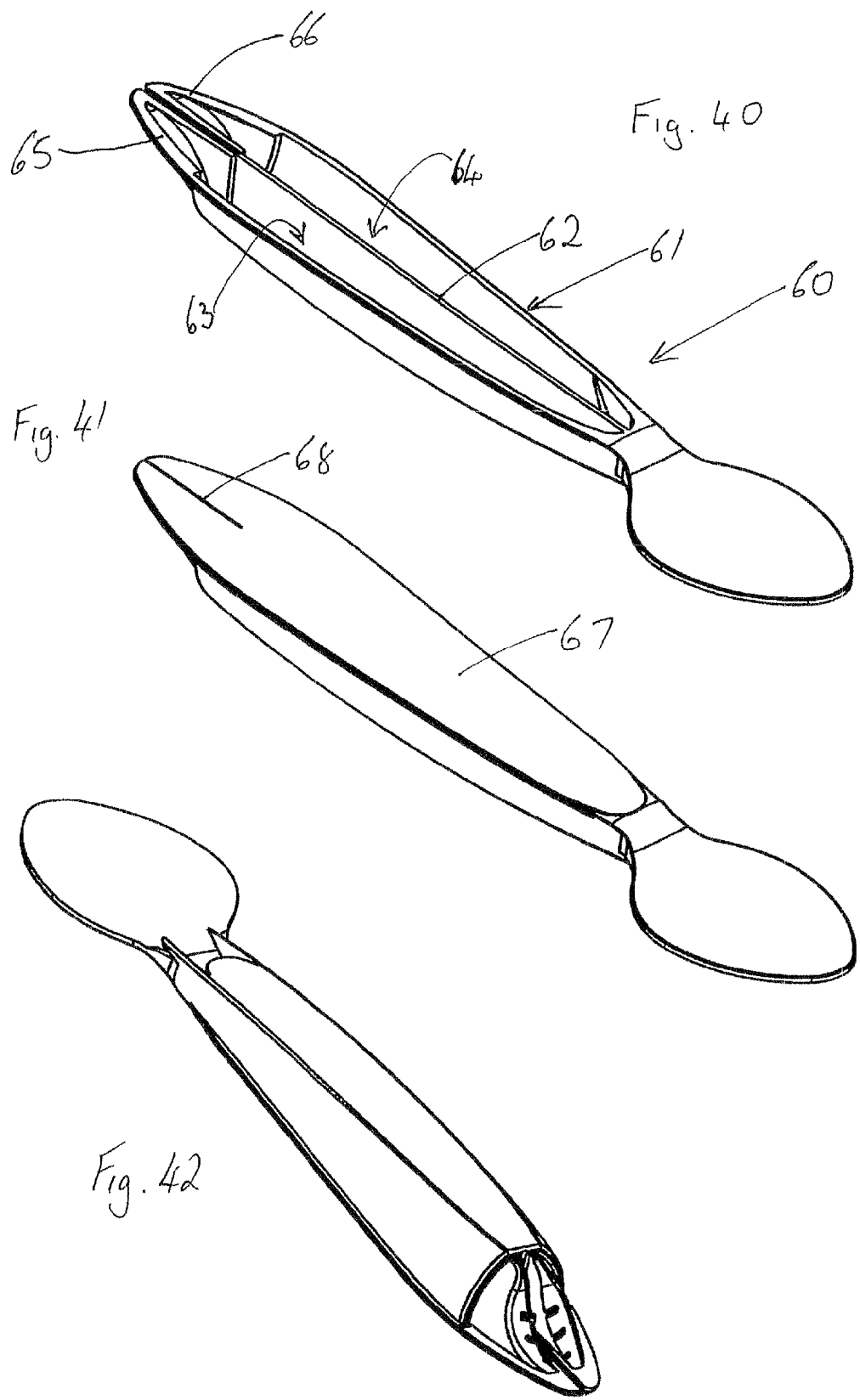

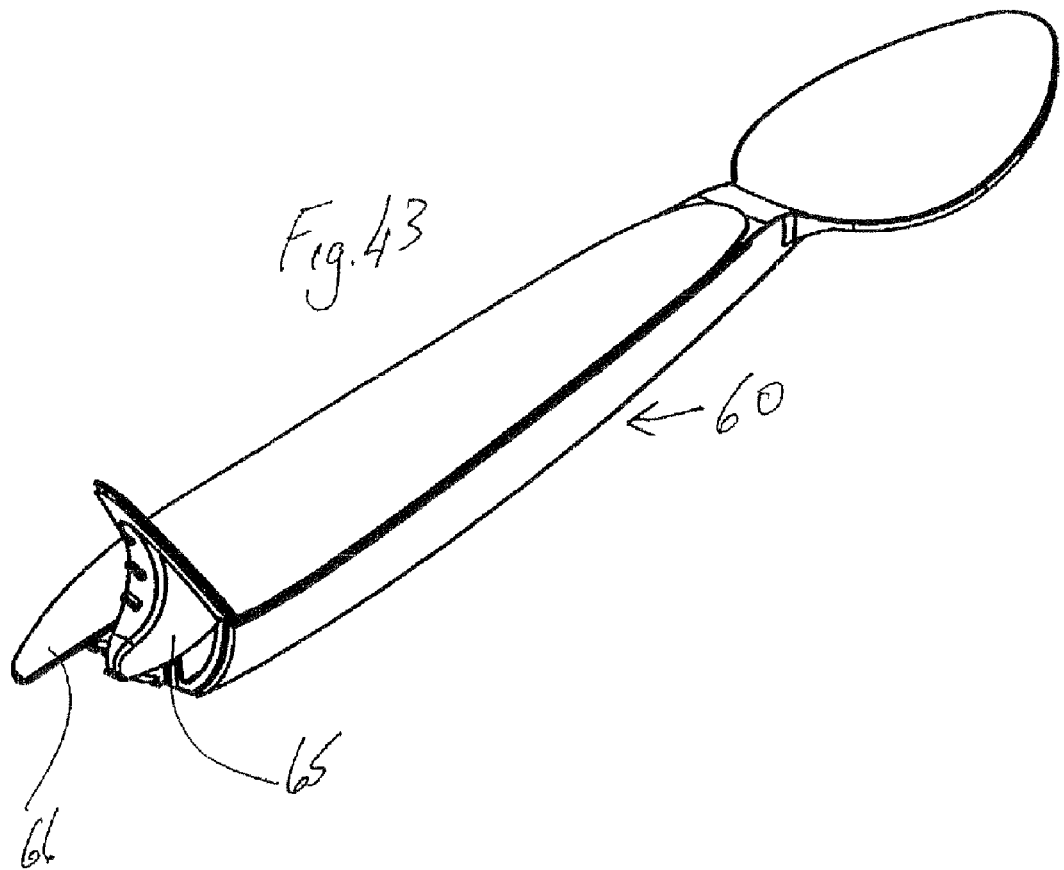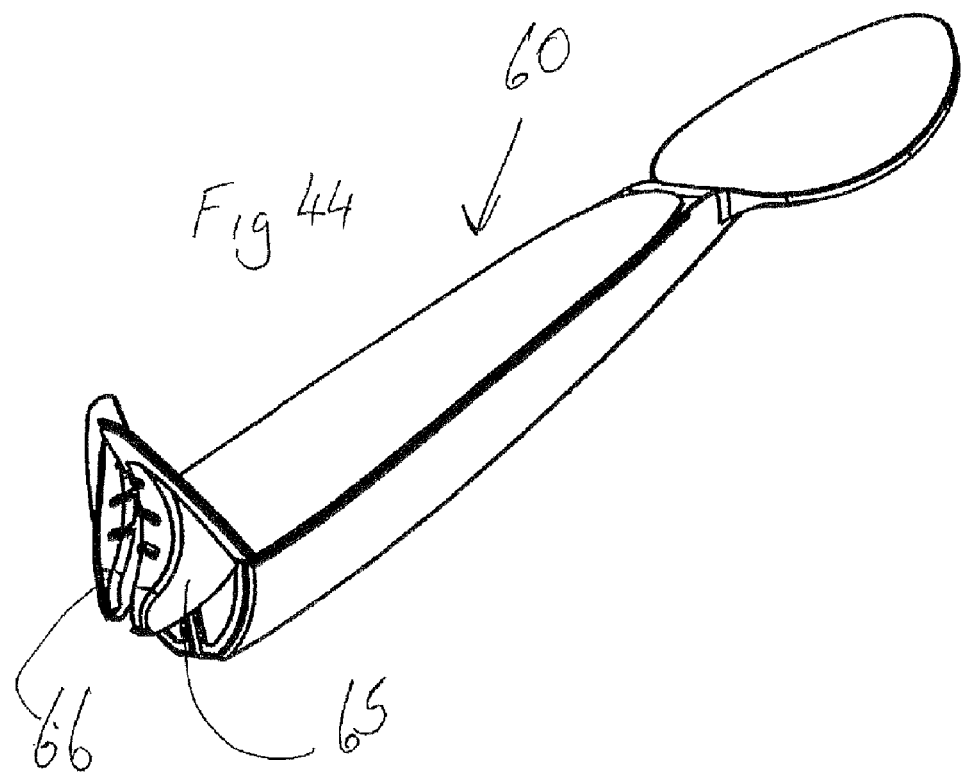

DISPENSING UTENSIL

CROSS-REFERENCE TO RELATED APPLICATIONS

This application is a continuation-in-part of International Application No. PCT/AU2004/001818, filed Dec. 30, 2004, the entire contents of which are hereby incorporated by reference.

FIELD OF INVENTION

The present invention relates to utensils that can store and dispense a liquid or solid. The present invention particularly but not exclusively is directed to dispensing spoons. Reference to dispensing spoons in the body of the specification is by way of example only and the present invention is not limited to a dispensing spoon. The term utensil within the specification includes a spoon, fork, knife, stirrer and any suitable instrument or implement.

BACKGROUND OF THE INVENTION

Spoons that can store and dispense ingredients have been developed to provide convenience and an alternative to the awkwardness of using separate items. The developed dispensing spoons dispense ingredients from the bowl of the spoon. The ingredients are stored in the spoon handle (such as U.S. Pat. No. 6,675,482, U.S. Pat. No. 5,491,895 and U.S. Pat. No. 5,154,318) or within the bowl of the spoon (such as U.S. Pat. No. 3,911,578, U.S. Pat. No. 3,946,652 and U.S. Pat. No. 4,338,338). These dispensing spoons suffer one or more of the following disadvantages including being expensive to manufacture, not suitable for reuse, unable to reclose the container portion and aesthetically unappealing.

OBJECT OF THE INVENTION

It is an object of the present invention to provide an alternative dispensing utensil that overcomes at least in part one or more of the above mentioned disadvantages.

SUMMARY OF THE INVENTION

A first aspect of the present invention provides a dispensing utensil comprising:
  a handle portion;
  an implement portion;
  a cavity for storing dispensable contents, the cavity defined by a first wall means and a second wall means closing the cavity;
wherein a first portion of the first wall means is openable about a hinge formed by the second wall means, thereby allowing the contents to be dispensed.

Preferably the second wall means is a pliable to wall, and preferably the second wall means is paper, film, foil or a laminate including paper, film or foil. Preferably the first wall means is a thin walled plastic shell.

In a preferred embodiment the first wall means has integrally formed first and second portions, and a failure zone between the first and second portions.

Advantageously, the dispensing utensil is economic to manufacture and fill. The cavity defined by the first wall means may have a relatively large area and thus may be top filled with contents and subsequently sealed by the second wall means much more efficiently than end filling arrangements. End filling of a tubular cavity is less efficient as the small end opening provides a limited filling area. Furthermore, provision of a tubular cavity requires a thick walled structure in order that the utensil has sufficient strength. The combination of these factors makes end filling expensive. In contrast, a dispensing utensil according to the present invention may be formed from a thin walled shell having a relatively large area, be filled very quickly and subsequently closed or sealed by a pliable top wall. Advantageously, empty shells may be nested for storage and transport, reducing the space required for transport and storage. This manufacturing process has reduced material costs and reduced process time and hence may be highly economical.

A further advantage of the present invention is its ease of use. The first portion of the first wall means is openable about the hinge formed by the second wall means. This allows for easy one-handed operation and also retains the first portion on the utensil, which may reduce littering etc.

The failure zone between the first and second portions could be a thinner area of material, or could be weakened by other failure means such as perforations. Advantageously, this also contributes to increased tamper-proofing of the utensil, as it is readily apparent that the utensil has been opened.

In one embodiment the first portion of the first wall means is distal from the implement portion. This advantageously allows for some contents to be dispensed, and for the tool to then be used without dispensing further contents (e.g., to stir a half portion of sugar in coffee).

In another embodiment the first portion of the first wall means is a proximal of the implement portion. This advantageously allows for contents to be dispensed and the tool immediately to be used without reversing (e.g., to stir a full portion of sugar in coffee).

Preferably, an embodiment of the invention further includes a second cavity for storing dispensable contents and preferably dispensing of contents from the second cavity is independently operable in the same manner as the first cavity. This advantageously allows for provision of complementary contents such as pepper and salt, in separately controlled portions.

Preferably, the first portion of the first wall means is re-closable, optionally by a friction fit. Advantageously, this prevents spillage and allows for any remaining contents to be used at a later time.

Preferably, the first portion of the first wall means has a thumb rest, increasing ease of use.

In a preferred embodiment, the second wall means is printed with one or more of: a measuring guide, product information, instructional information, graphics, branding or advertising. Preferably, the second wall means includes a window portion allowing the contents to be viewed, and preferably the first and/or second wall means may be deformed to control dispensing of contents. This advantageously allows for flexible and easy portion control when dispensing contents.

Preferably, the handle portion and implement portion are integrally formed.

A second aspect of the present invention provides a dispensing utensil comprising:
  a handle portion;
  an implement portion;
  a cavity for storing dispensable contents;
  a pliable top wall closing the cavity;
wherein a lid connected to the top wall is openable about a hinge means formed by the top wall, thereby allowing the contents to be dispensed.

A third aspect of the present invention provides a dispensing utensil shell comprising:

a handle portion;
an implement portion;
a cavity for storing dispensable contents, the cavity defined by a first wall means;
wherein the first wall means is adapted to co-operate with a second wall means for closing the cavity;
wherein the first wall means has integrally formed first and second portions, and a failure zone between the first and second portions, whereby in use, a first portion of the first wall means is openable about a hinge formed by the second wall means, thereby allowing the contents to be dispensed. Advantageously, the shell may be nested for storage and transport, prior to being filled with contents and closed or sealed.

Tools (implements) which may be incorporated in the dispensing utensil include (but are not limited to) stirrers, mixing paddles, spoons, forks, knifes, chopsticks, drinking straws, brushes (of many types), tooth picks, floss picks, mops, tongs, tweezers, razors, trowels and spades, spatulas and combs.

The dispensing utensil's contents are preferably synergistically paired with the tool for maximum effectiveness. Some non-limiting examples may include sugar or energy drink concentrate in a spoon or stirrer, wasabi and soy sauce in chopsticks, cocktail stirrer and alcohol shot, two-part glue with a stirrer/mixing spatula, touch-up or children's paint with a brush, toothpaste with toothbrush, dental floss pick and mouthwash, medicament or ointment such as cold-sore cream with applicator pad/brush, cooking oil in a spatula or barbeque tongs, salad dressing in salad-serving spoon, tweezers with antiseptic ointment, brush with marinade sauce, razor with shaving creme, garden trowel or spade with seeds, paint stirrer with colour tint, washing brush with detergent, spatula with putty or gap filler, mop with disinfectant or floor cleanser, comb or brush with hair treatment or styling product.

Contents which may conveniently be dispensed from a dispensing utensil according to the present invention include, but are not limited to, the following whether in powdered, granulated, liquid or other forms.

Food and beverage products including tea, coffee, sugar, sugar-substitutes and artificial sweeteners, paste, marinade, dried fruit and nuts, milk, drinking additives syrups and powders including hot chocolate, toppings, cordials, alcoholic beverages, confectionery such as sprinkles, chocolates, jollies, salt and pepper, spices, herbs, sauces, dressings, spreads, condiments including soy sauce, mustard, mayonnaise.

Nutraceuticals (for people and animals) including energy & vitamin supplements and concentrates, food supplements, dieting and slimming mixes and powders.

Medicaments, medicines and pharmaceuticals (for people and animals) including drugs, creams, pills, cough syrups, non-prescription medicines such as headache and anti-inflammatory tablets.

Personal care products including toothpaste, mouthwash, floss, hair products and treatments such as shampoos, dyes, hair ties and pins, shaving creams, antiseptics and disinfectants, toothpicks, massage oil, moisturisers, sunscreens, soap and liquid soaps.

Household products including cleaning fluids and detergents, cleansers, furniture oils, bleaches.

Office products including inks, rubber bands, paper clips, staples, drawing pins, nails and tacks, adhesives.

Hardware items including screws, washers, nails, tacks.

Garden and plant products including seeds, fertilizer, poisons, flower booster.

Chemical products for domestic and industrial use, including adhesives and paint products including artists and children's paints, household paint, paint tints, putty fillers.

BRIEF DESCRIPTION OF THE DRAWINGS

Other features and advantages of one or more preferred embodiments of the present invention will be readily apparent to one of ordinary skill in the art from the following written description with reference to and, used in conjunction with, the accompanying drawings showing preferred embodiments of the invention, in which:

FIG. 1 is a plan view of a single chamber dispensing spoon without a top wall;
FIG. 2 is a side view of the dispensing spoon of FIG. 1;
FIG. 3 is a bottom view of the dispensing spoon of FIG. 1;
FIG. 4 is a front view of the dispensing spoon of FIG. 1;
FIG. 5 is a rear view of the dispensing spoon of FIG. 1;
FIG. 6 is a plan view of a single chamber dispensing spoon with a top wall;
FIG. 7 is a side view of the dispensing spoon of FIG. 6;
FIG. 8 is a sectional view (section B-B) of the dispensing spoon of FIG. 6;
FIG. 9 is a sectional view (section A-A) of the dispensing spoon of FIG. 6;
FIG. 18 is a plan view of another embodiment of a single chamber dispensing spoon with a top wall;
FIG. 19 is a longitudinal sectional view of the dispensing spoon of FIG. 18;
FIG. 20 is a bottom view of the dispensing spoon of FIG. 18;
FIG. 21 is a rear view of the dispensing spoon of FIG. 18;
FIG. 22 is a front view of the dispensing spoon of FIG. 18;
FIG. 25 is a plan view of a third embodiment of a single chamber dispensing spoon;
FIG. 26 is a side view of the dispensing spoon as shown in FIG. 25;
FIG. 27 is a bottom view of the dispensing spoon as shown in FIG. 25;
FIG. 28 is a rear view of the dispensing spoon as shown in FIG. 25;
FIG. 29 is a front view of the dispensing spoon as shown in FIG. 25;
FIG. 30 is a top perspective view of the dispensing spoon as shown in FIG. 25;
FIG. 31 is a bottom perspective view of the dispensing spoon as shown in FIG. 25.

FIG. 40 is a perspective view of the double chamber dispensing spoon as shown in FIG. 33;

FIG. 41 is a perspective view of the double chamber dispensing spoon as shown in FIG. 38;

FIG. 42 is a bottom perspective view of the double chamber dispensing spoon as shown in FIG. 38;

FIG. 43 is a top perspective view of the double chamber dispensing spoon as shown in FIG. 38 with one lid open;

FIG. 44 is a top perspective view of the double chamber dispensing spoon as shown in FIG. 38 with both lids open;

DESCRIPTION OF PREFERRED EMBODIMENT

Figure 10:
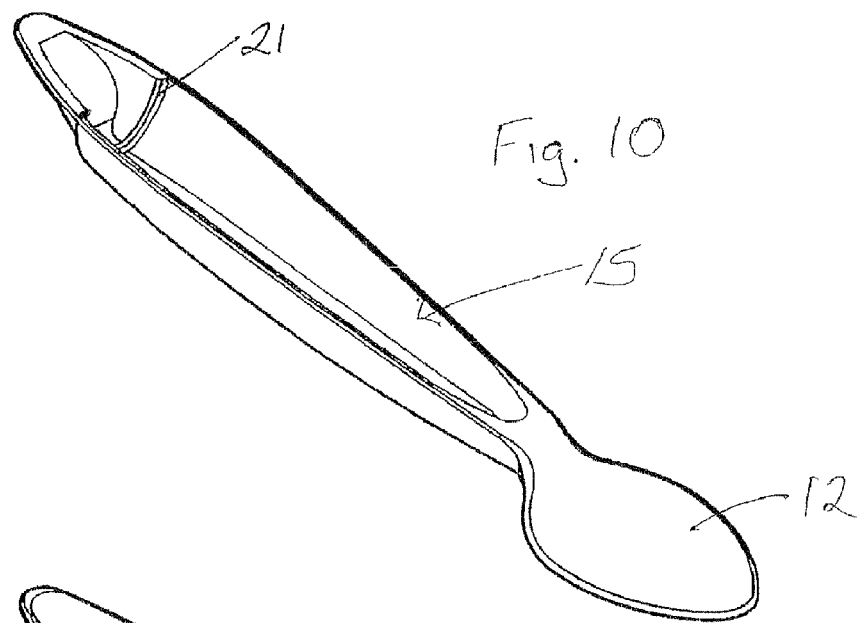
FIG. 10 is a top perspective view of a single chamber dispensing spoon without a top wall and a partial cut away lid section.
Figure 11:
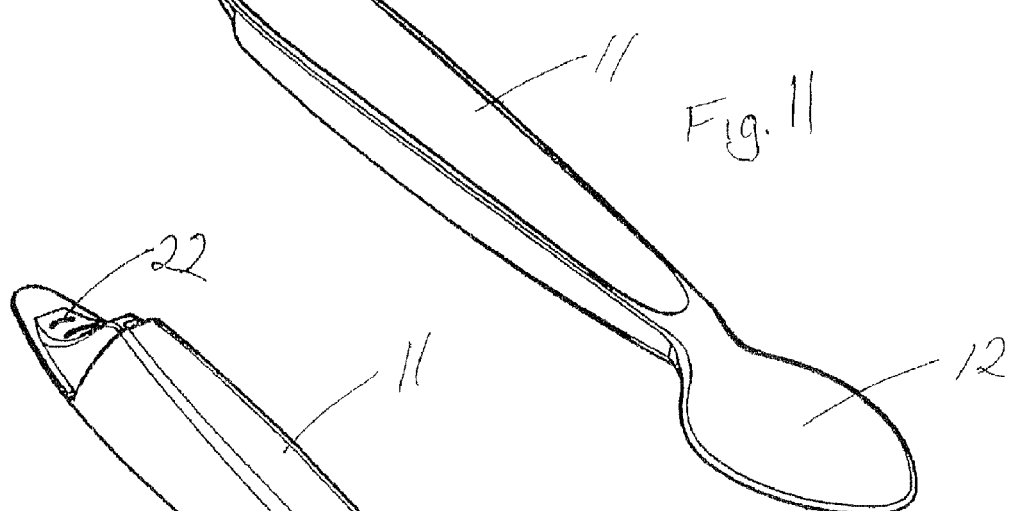
FIG. 11 is a top perspective view of a single chamber dispensing spoon with a top wall.
Figure 12:
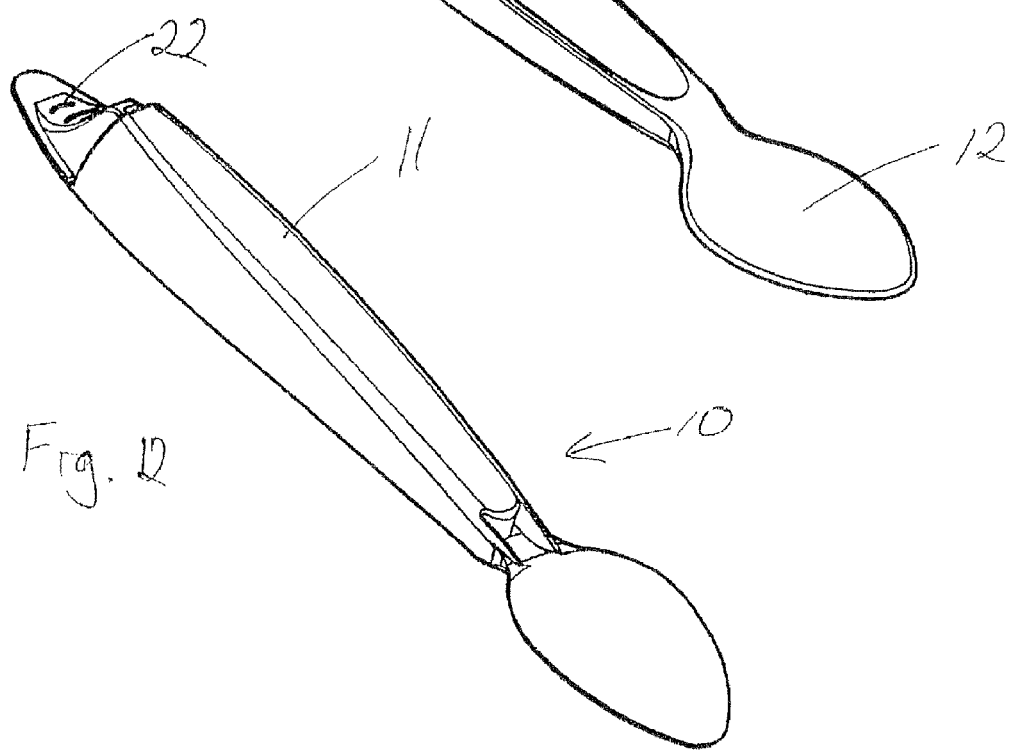
FIG. 12 is a bottom perspective view of a single chamber dispensing spoon as shown in FIG. 11.

With reference to FIGS. 1 to 12, there is shown a single chamber dispensing spoon (utensil) 10 having a handle 11 integral with a spoon bowl (implement portion) 12 to form a single unit. The handle 11 has opposing side walls (first wall means) 13, 14 which form a substantially U-shaped elongate chamber (cavity) 15. The side walls 13, 14 are substantially the same height and each have a flat top surface 16, 17 respectively. As the handle 11 forms a U-shaped elongate chamber 15 to hold dispensable items (contents), it may be made of plastic material with relatively thin walls. In contrast, the surrounding walls of tubular shaped handles are comparatively thicker by design than the walls of the handle 11.

A pliable top wall (second wall means) 19 is fixable to the flat top surface 16, 17 surrounding the elongate chamber 15. The pliable top wall 19 closes chamber 15 and may be heat sealed or induction sealed where the top wall is film or foil respectively. In the present embodiment the pliable top wall 19 is made of foil. The pliable top wall 19 is fixed to the flat top surface 16, 17 after the dispensable items (contents) have filled the elongate chamber 15. The fixing of the pliable top wall 19 to the flat top surface 16, 17 after the chamber has been filled with dispensable items avoids the problems associated with the end filling of dispensable items in preformed tubular type containers. In this way a dispensing utensil is produced by a three stage process involving the formation of a chamber, filling the chamber with dispensable items and sealing the chamber with a pliable top wall.

There is a lid portion (first portion) 20 formed as part of an end portion of side walls 13, 14 of handle 11. In this embodiment, the lid portion 20 is at the opposite (distal) end of the utensil from the spoon bowl 12. The lid portion 20 is surrounded by a thin section (failure zone) 21 which defines the sides of the lid 22 when it is opened. The failure zone 21 is located between the first portion 20 and a second portion 26 of first wall means 13, 14. The lid 22 is formed from the lid portion 20 when pressure is applied and the surrounding thin section 21 is torn and the lid 22 is pressed outward.

Figure 13:
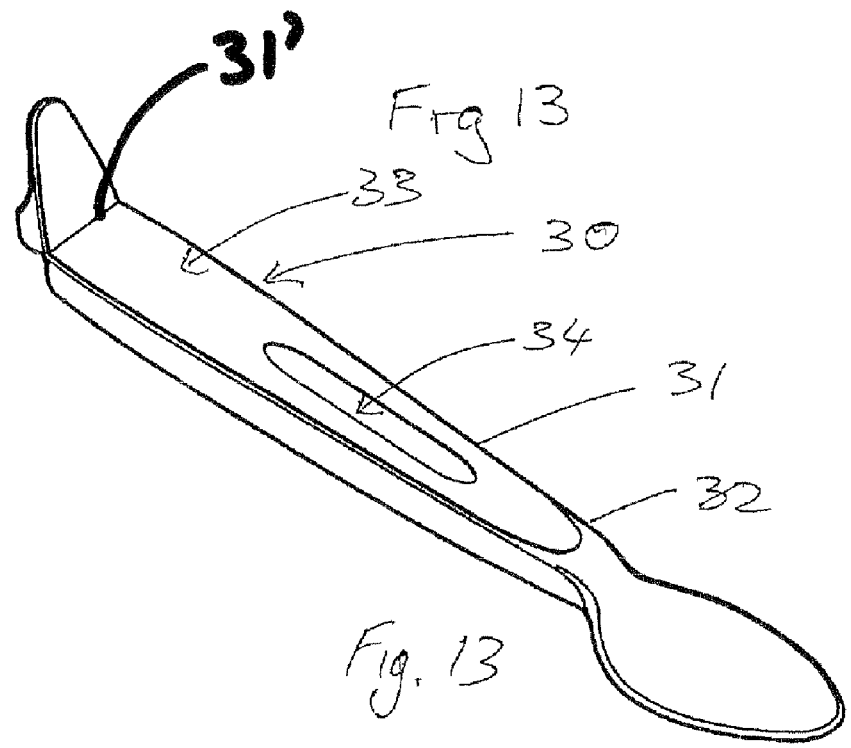
FIG. 13 is a top perspective view of a single chamber dispensing spoon where the top wall has a window and the lid is open.
Figure 14:
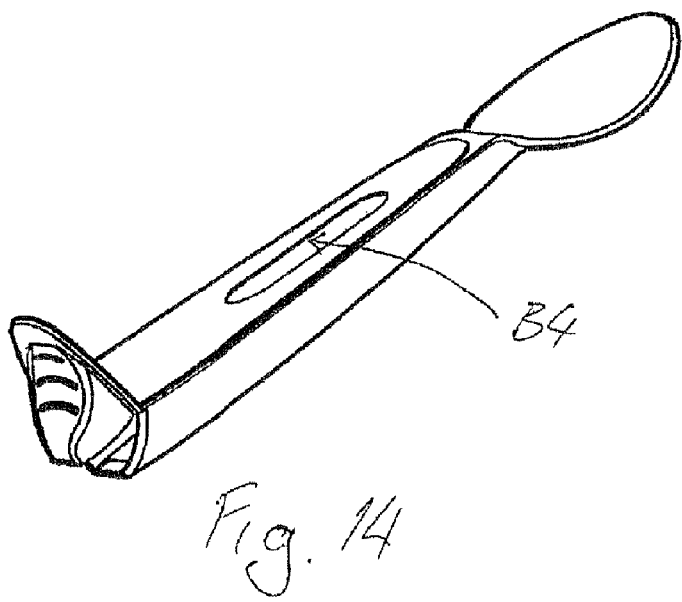
FIG. 14 is a rear perspective view of the dispensing spoon shown in FIG. 13.
Figure 15:
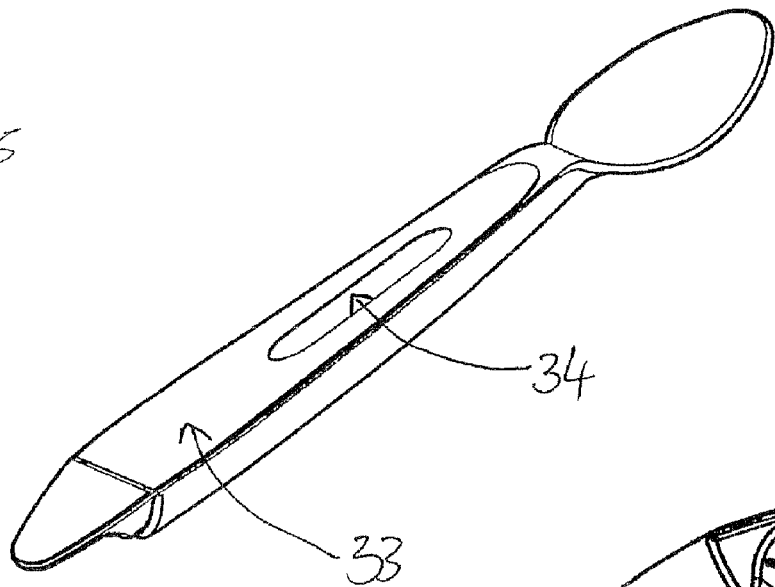
FIG. 15 is a top perspective view of a single chamber dispensing spoon where the top wall has a window and the lid has been reclosed.
Figure 16:
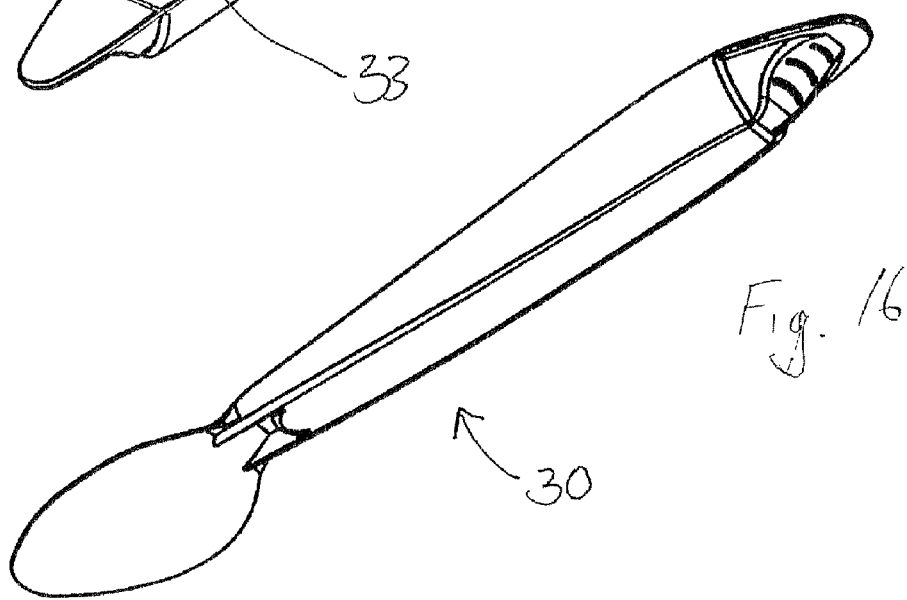
FIG. 16 is a bottom perspective view of the dispensing spoon of FIG. 15.
Figure 17:
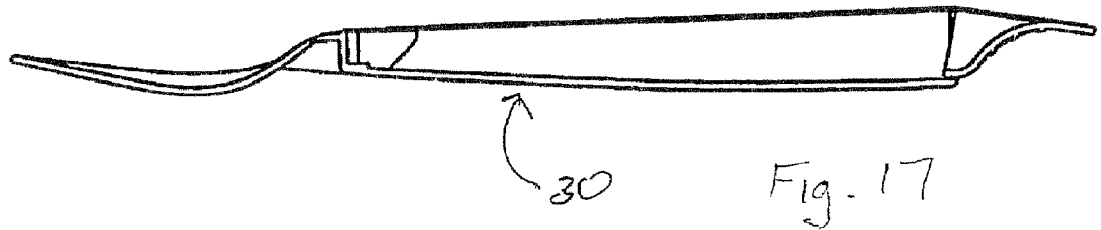
FIG. 17 is a side view of the dispensing spoon of FIG. 15.
Figure 23:
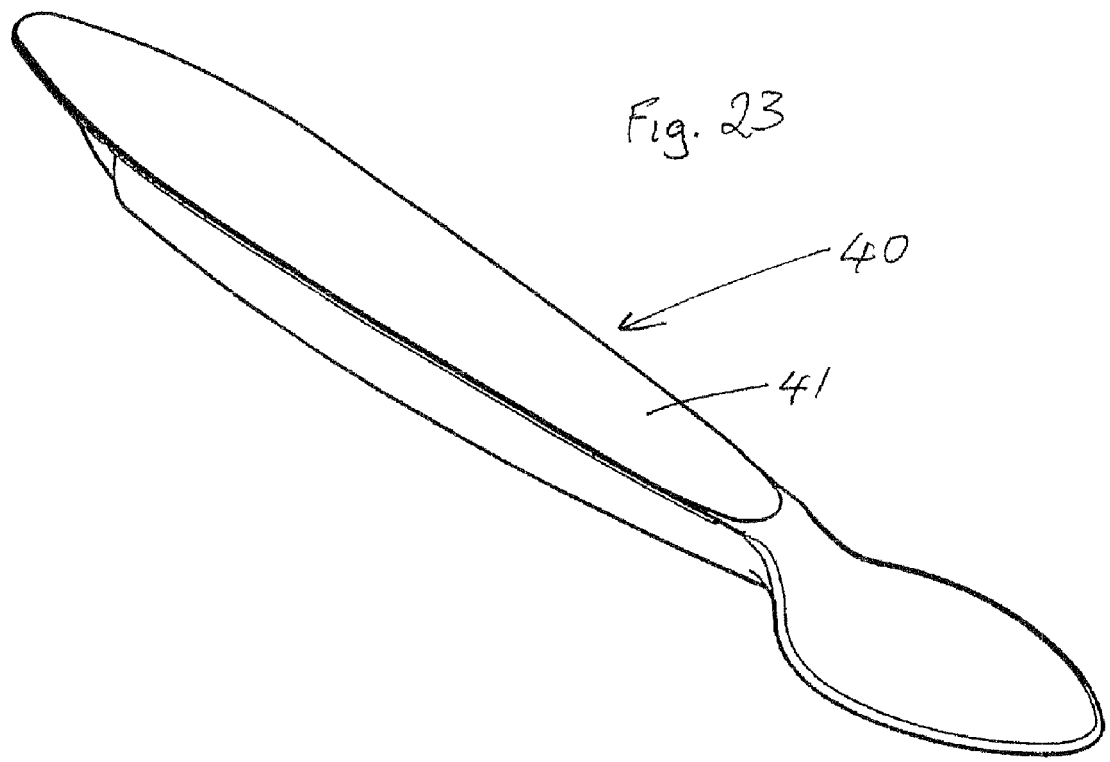
FIG. 23 is a top perspective view of the dispensing spoon as shown in FIG. 18.
Figure 24:
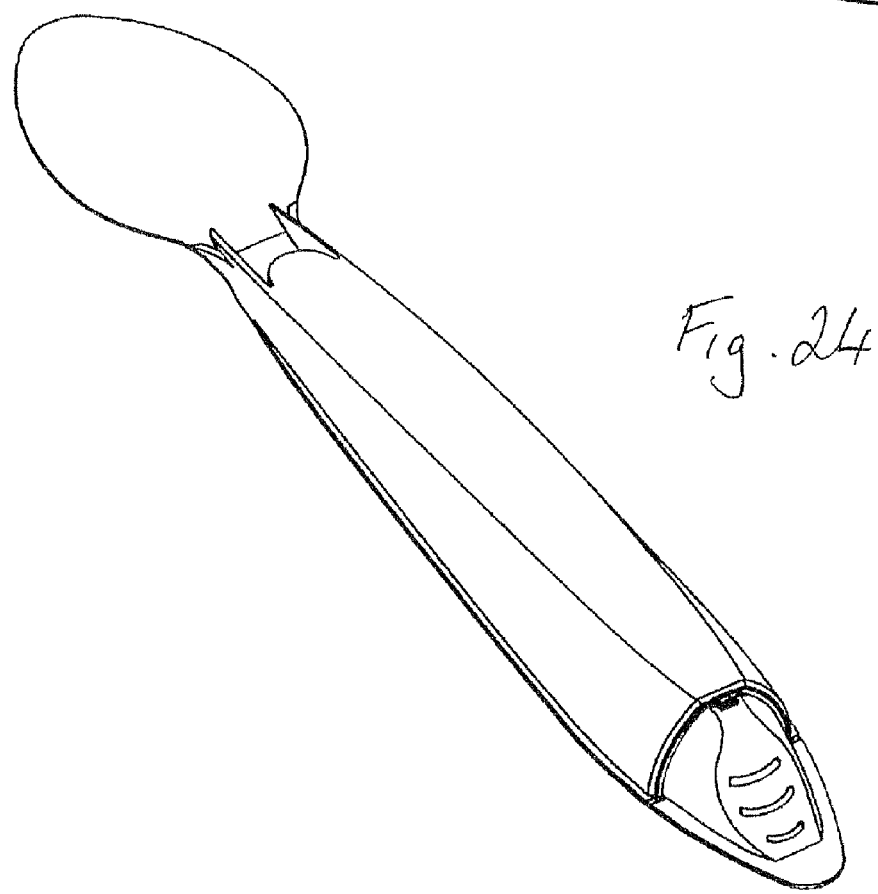
FIG. 24 is a bottom perspective view of the dispensing spoon as shown in FIG. 18.

The lid portion 20 including lid 22 is shaped to allow a thumb to rest against it and open it with applied pressure. Advantageously, one-handed operation is possible. The applied pressure tears the thin section 21, causing the lid 22 to open about a hinge 19' formed by the pliable foil top wall 19. The lid portion 20 has support protrusions (thumb rest) 23 to provide a grip for the thumb. The lid portion 20 also has a friction-fit protrusion 24 enabling the lid 22 to reclose. A dispensing spoon in the open position is shown in FIG. 13.

Figure 32:
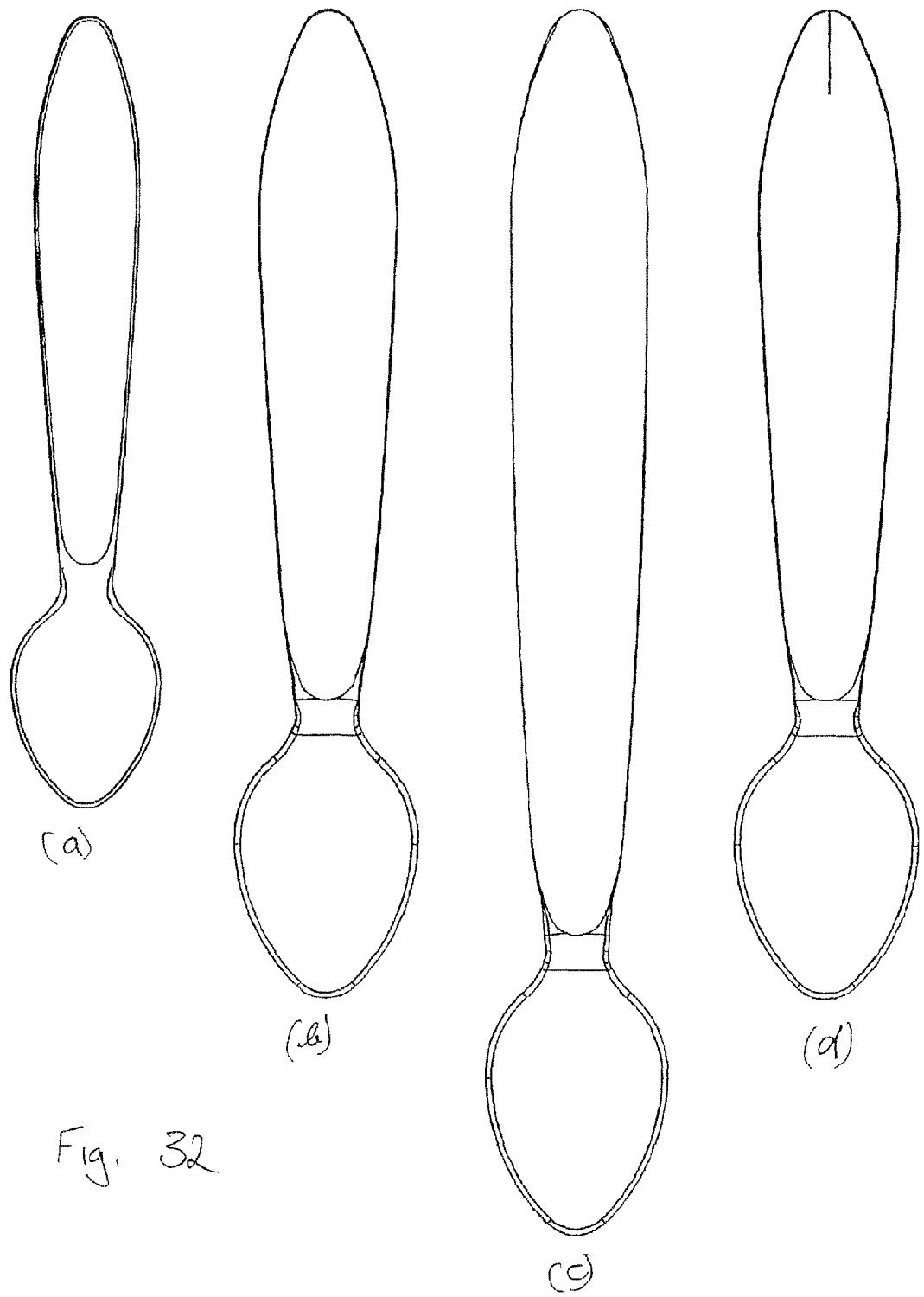
FIG. 32 is a comparison of the different dispensing spoons wherein (a) is a plan view of a single chamber dispensing spoon corresponding to FIG. 6, (b) is a plan view of a single chamber dispensing spoon corresponding to FIG. 18, (c) is a plan view of a single chamber dispensing spoon corresponding to FIG. 25, and (d) is a plan view of a double chamber dispensing spoon corresponding to FIG. 38.
Figure 36:
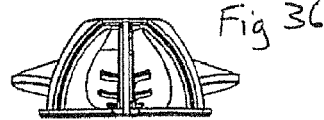
FIG. 36 is a rear view of the dispensing spoon as shown in FIG. 33.
Figure 33:
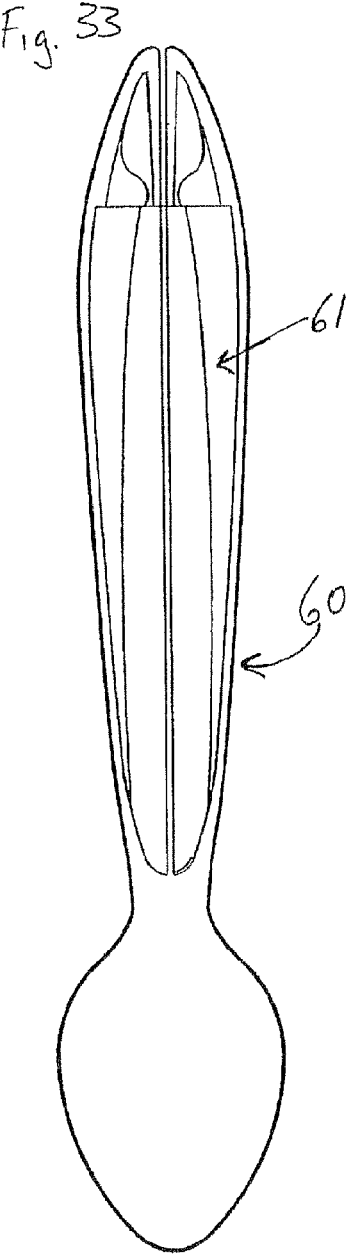
FIG. 33 is a plan view of a double chamber dispensing spoon without a top wall.
Figure 34:
FIG. 34 is a side view of the dispensing spoon as shown in FIG. 33.
Figure 35:
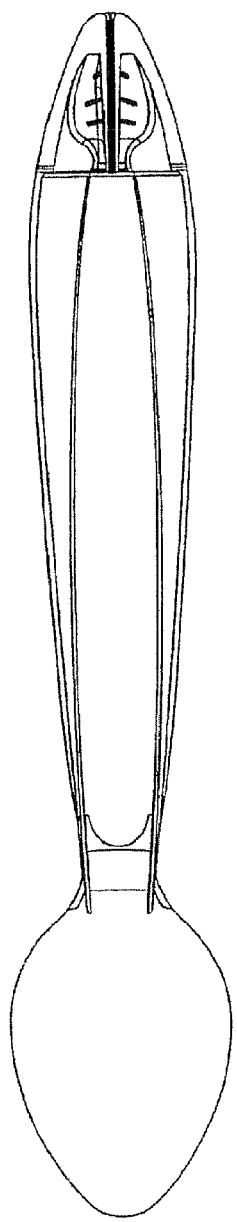
FIG. 35 is a bottom view of the dispensing spoon as shown in FIG. 33.
Figure 37:
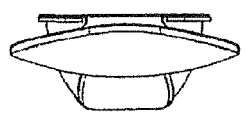
FIG. 37 is a front view of the dispensing spoon as shown in FIG. 33.
Figure 39:
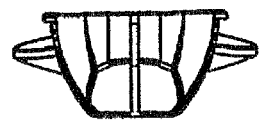
FIG. 39 is a rear view of the dispensing spoon as shown in FIG. 38.
Figure 38:
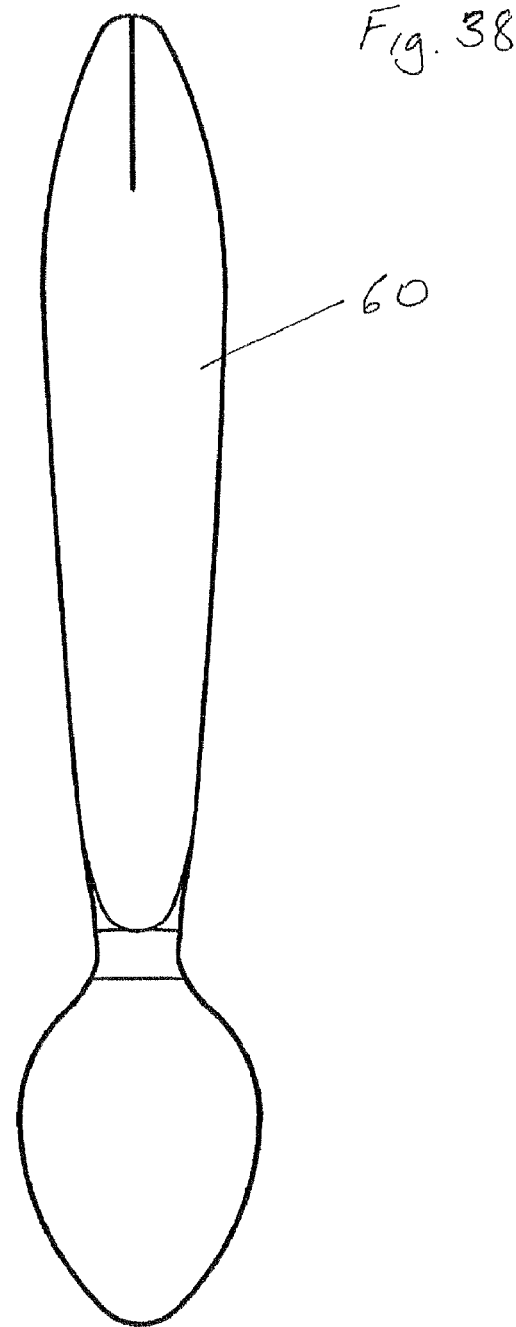
FIG. 38 is a plan view of a double chamber dispensing spoon with a top wall.
Figure 45:
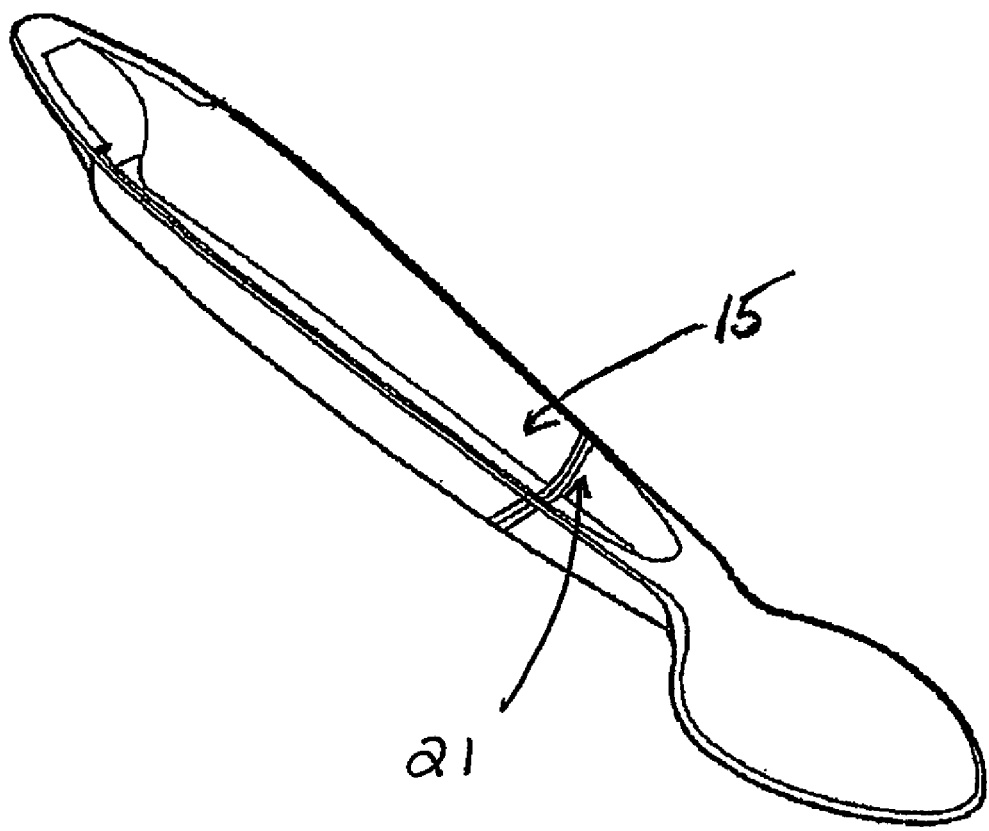
FIG. 45 is side elevational view of another alternate embodiment of the dispensing spoon.
Figure 46:
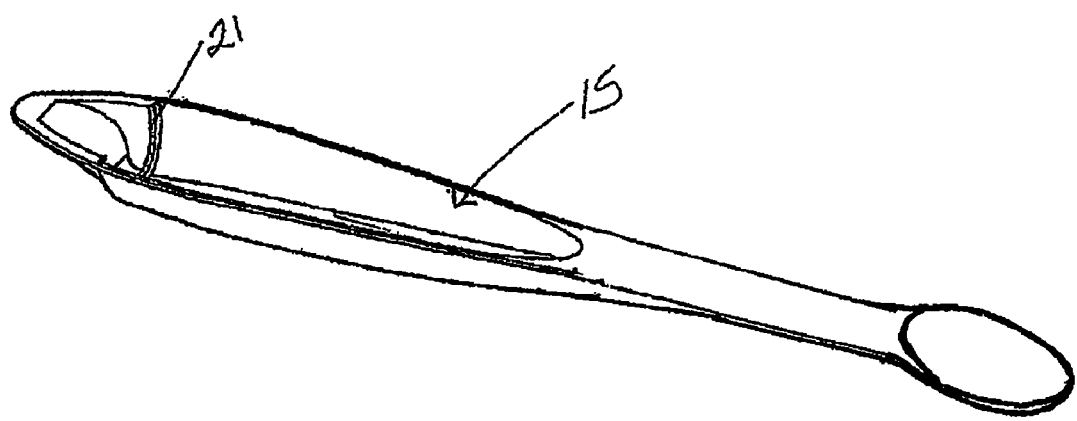
FIG. 46 a perspective view of a dispensing stirrer.
Figure 47:
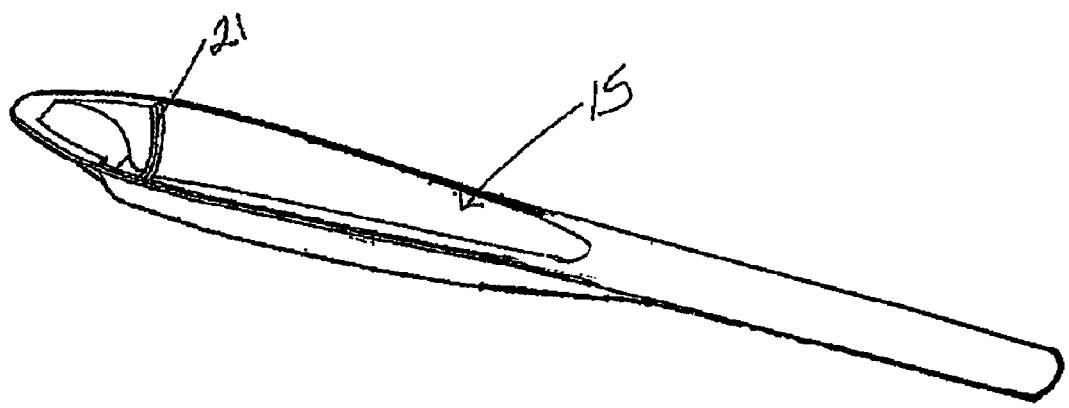
FIG. 47 is a perspective view of a dispensing mixing paddle.
Figure 48:
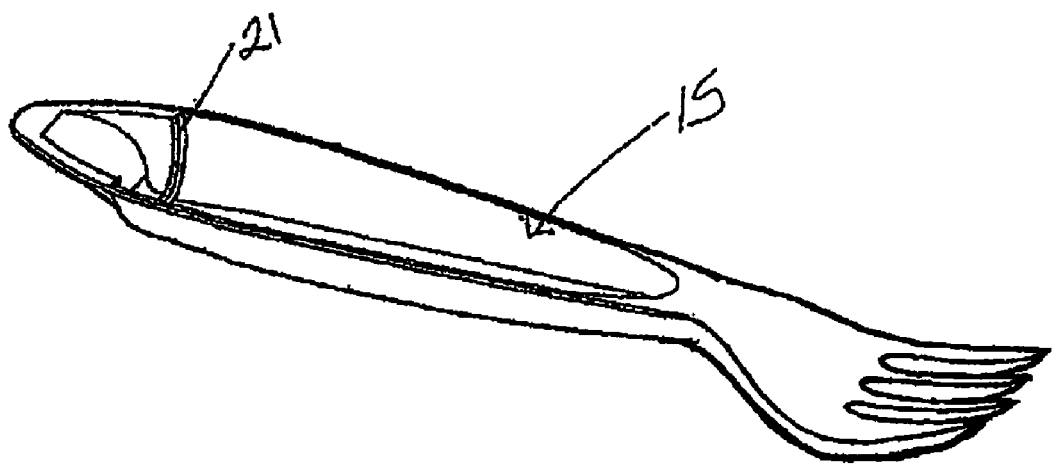
FIG. 48 is a perspective view of a dispensing fork.
Figure 49:
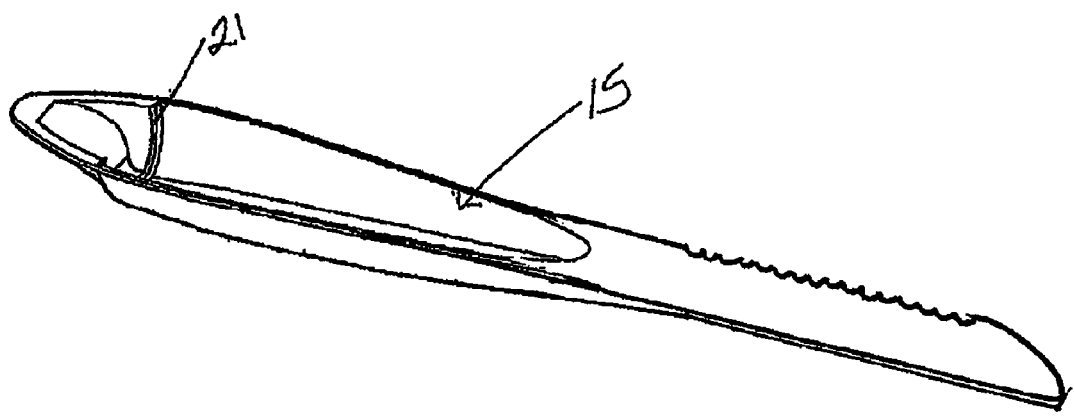
FIG. 49 is a perspective view of a dispensing knife.
Figure 50:
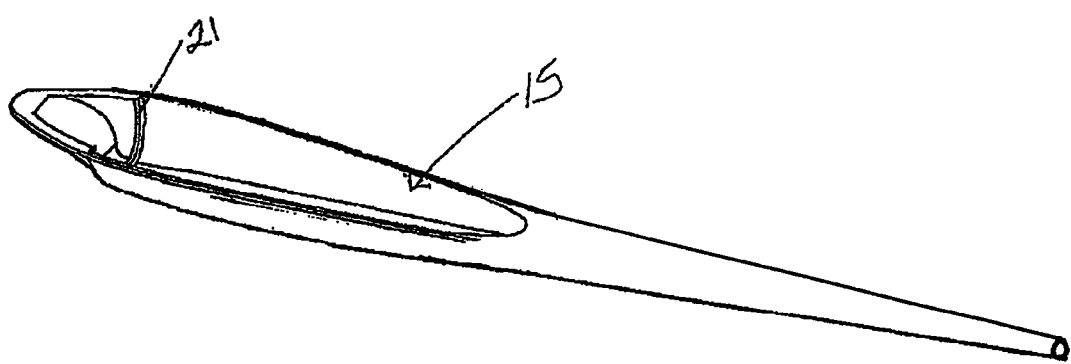
FIG. 50 is a perspective view of a dispensing chopstick.
Figure 51:
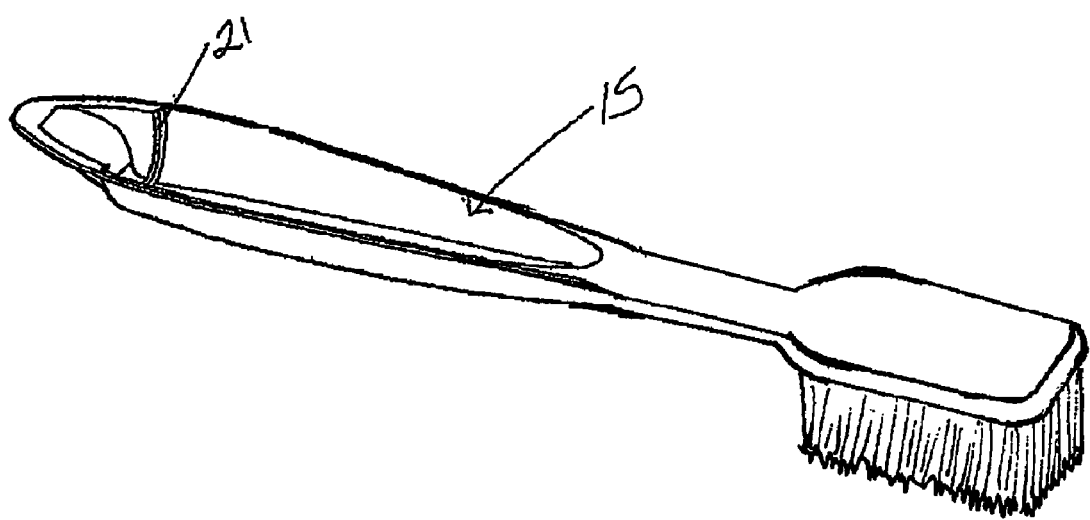
FIG. 51 is a perspective view of a dispensing brush.
Figure 52:
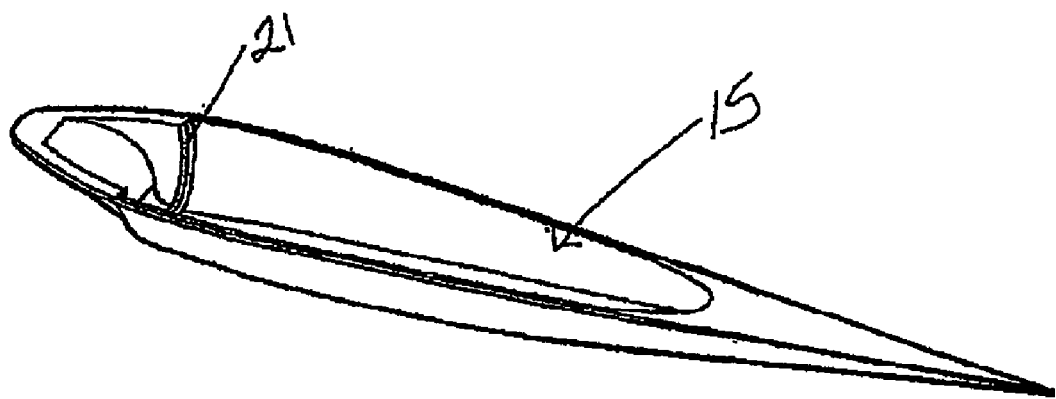
FIG. 52 is a perspective view of a dispensing tooth pick.
Figure 53:
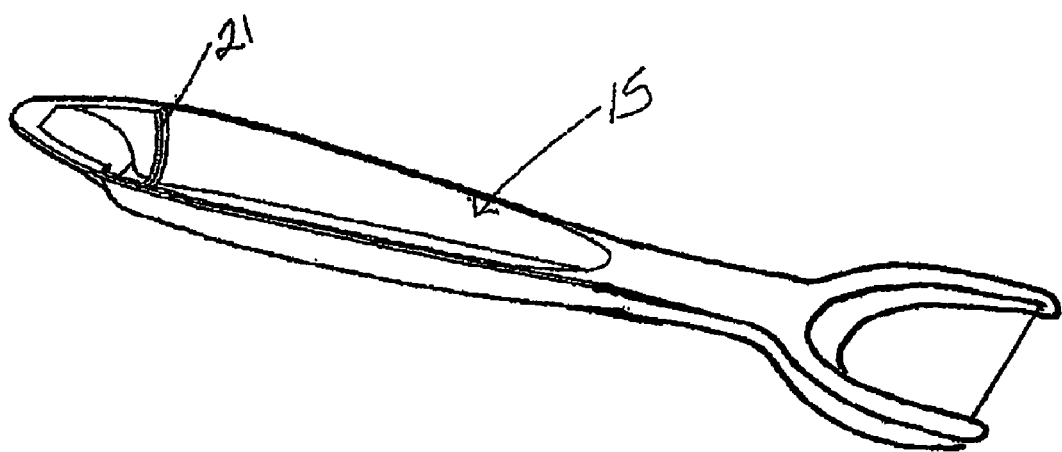
FIG. 53 is a perspective view of a dispensing floss pick.
Figure 54:
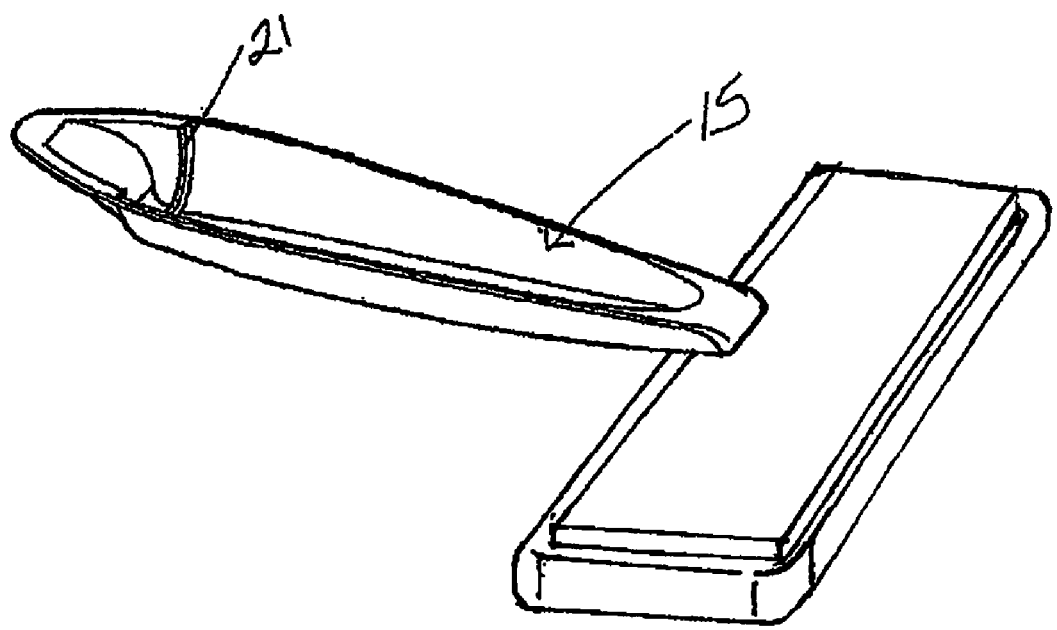
FIG. 54 is a perspective view of a dispensing mop.
Figure 55:
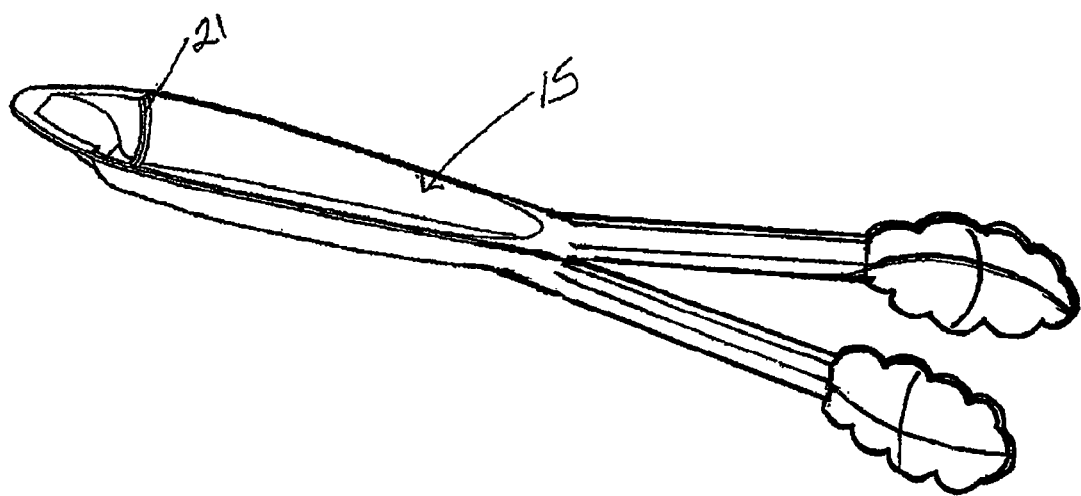
FIG. 55 is a perspective view of a dispensing tongs.
Figure 56:
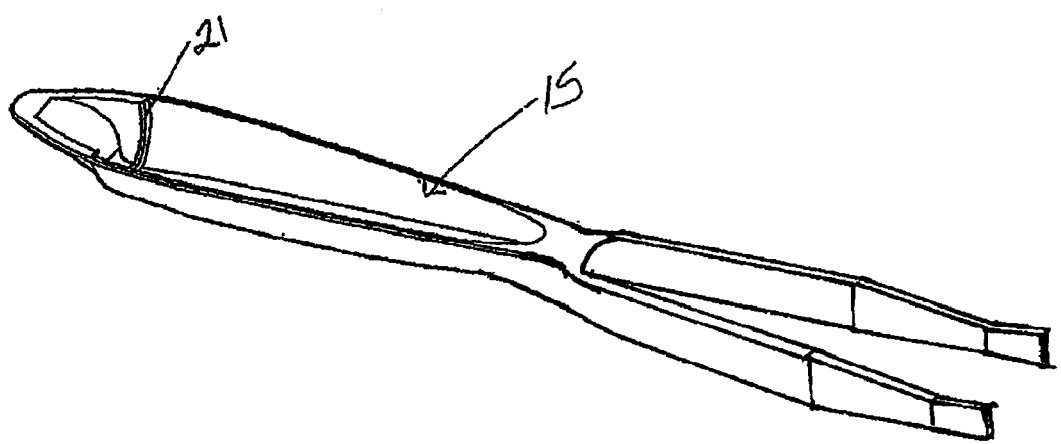
FIG. 56 is a perspective view of a dispensing tweezer.
Figure 57:
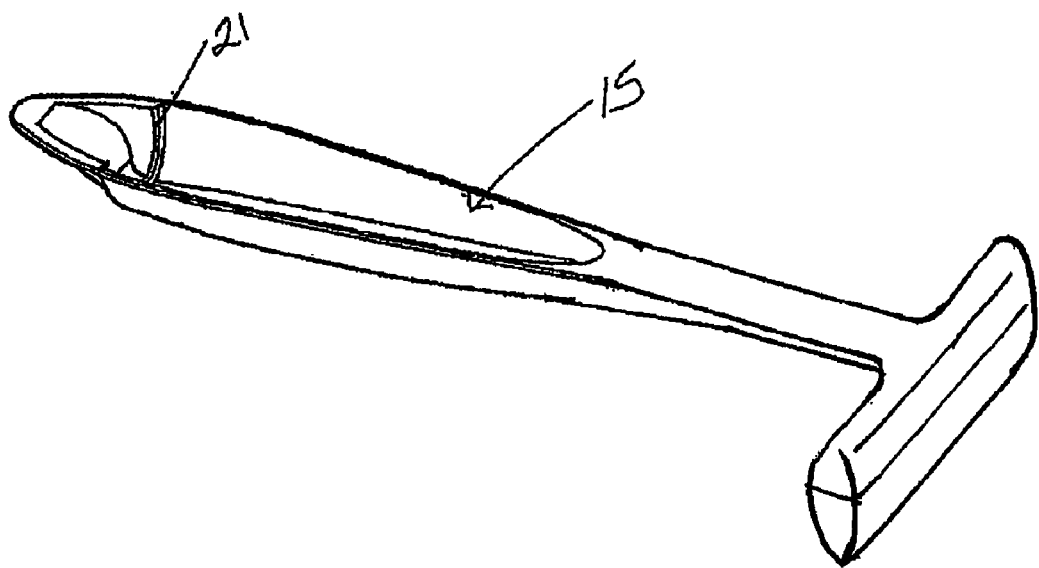
FIG. 57 is a perspective view of a dispensing razor.
Figure 58:
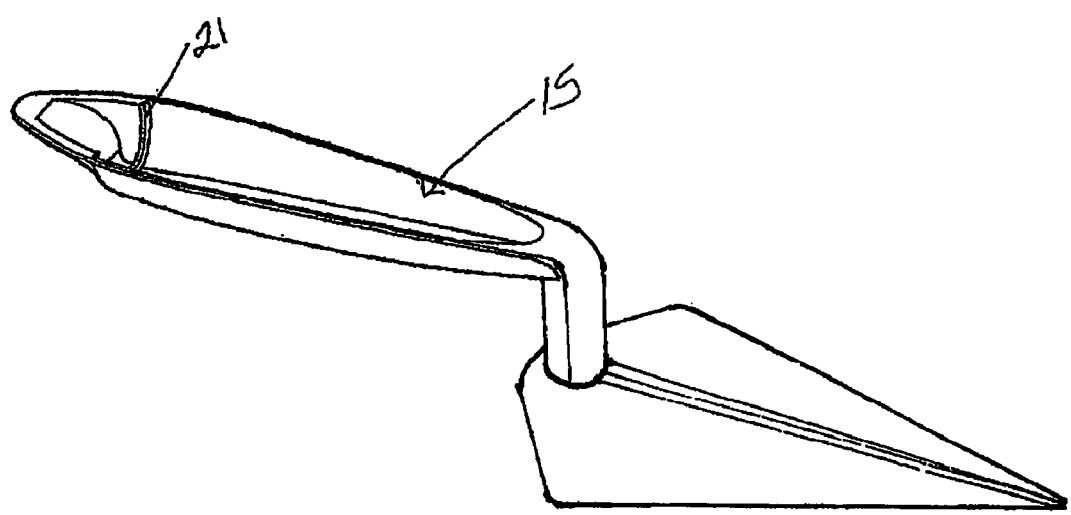
FIG. 58 is a perspective view of a dispensing trowel.
Figure 59:
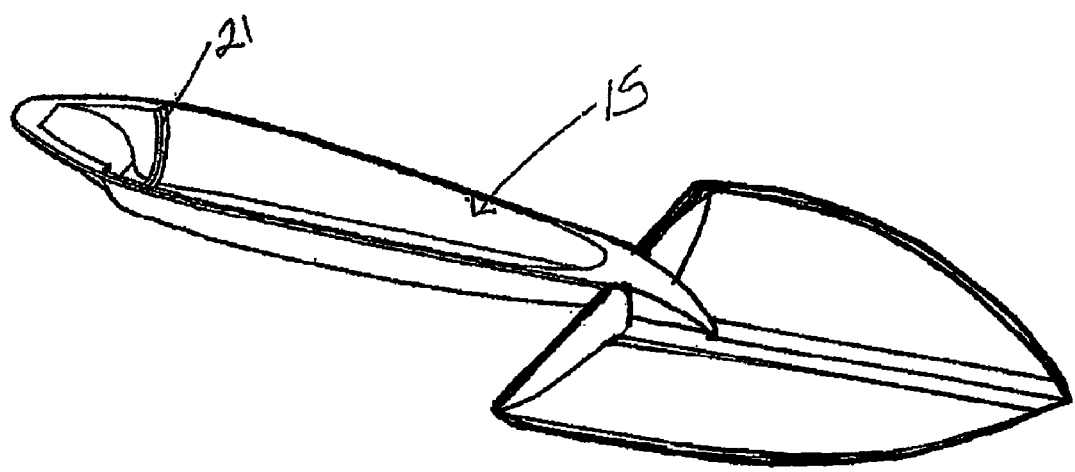
FIG. 59 is a perspective view of a dispensing spade.
Figure 60:
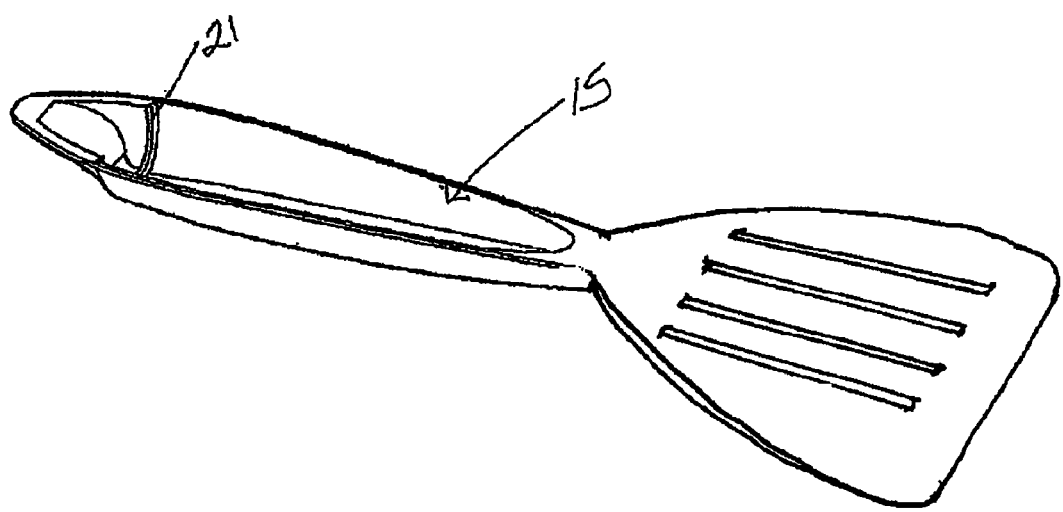
FIG. 60 is a perspective view of a dispensing spatula.
Figure 61:
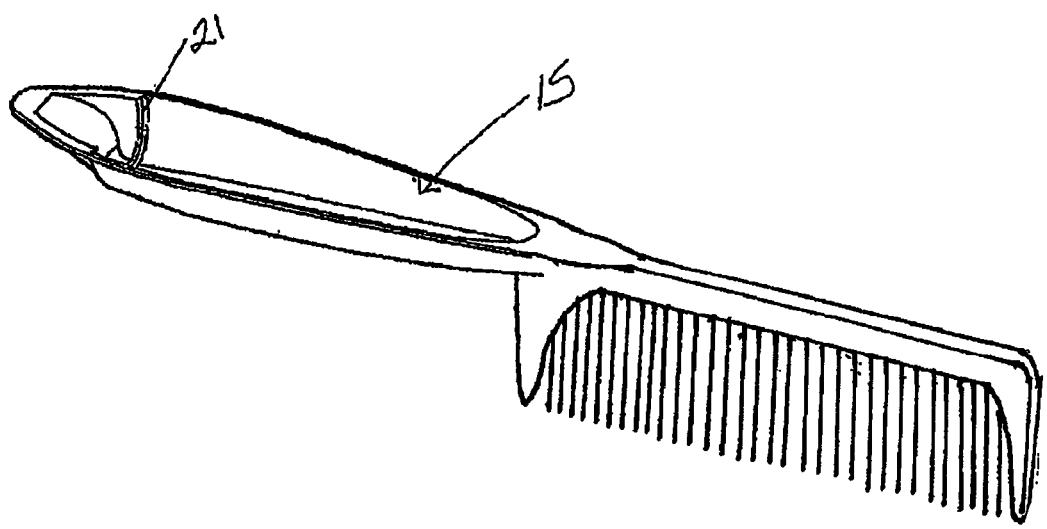
FIG. 61 is a perspective view of a dispensing comb.

The pliable top wall 19 has a flat and relatively level upper surface 25 to provide an aesthetically pleasing spoon similar to conventional spoons and provide a comfortable grip for the user. The flat and relatively level upper surface 25 of the pliable top wall 19 is maintained irrespective of the length, depth and width dimensions of the chamber 15. Handles with different capacities of holding dispensable material is shown in FIG. 32 where the utensil shown in (a) represents a single serve, (b) represents a double serve and (c) represents a quad serve.

The pliable top wall 19 provides an upper surface 25 on which information, branding, graphics and advertising can be displayed. The information that may be displayed may include dietary information, instructional information, contents information and dispensing information. For example, the top surface 25 may display dispensing information in the form of a ruler indicating where a person may press in order to dispense a particular part serve. Advantageously, the pliable top wall 19 and/or the first wall means 13, 14, may be deformed or pressed to control dispensing of contents.

In another embodiment shown in FIGS. 13 to 17, the utensil 30 has an upper wall 31 fixed to the elongate body 32 of handle 33. The upper wall 31 has a clear window section 34 through which a person may view the dispensable contents. Other features of the embodiment shown in FIGS. 13 to 17 are similar to those described above, in which the lid may be opened about hinge 31'.

A further embodiment is shown in FIGS. 18 to 24. This embodiment shows a utensil 40 with a large handle 41 providing a larger chamber 42 to store an increased amount of dispensable items to form a double serve dispensing utensil 40. The dimensions of the double serve dispensing utensil 40 are substantially proportional but larger than the dimensions of the single serve utensil 10 shown in FIGS. 1 to 12.

Another embodiment of the dispensing utensil is shown in FIGS. 25 to 31. The dispensing utensil 50 shown in these Figures is substantially elongate compared to the single and double serve dispensing utensils 10, 40 respectively. The dispensing utensil 50 has a comparatively larger chamber to store a larger amount of dispensing items and forms a quad serve dispensing utensil.

A further embodiment of the dispensing utensil is shown in FIG. 32(*d*) and FIGS. 33 to 44. In this embodiment the dispensing utensil 60 has a handle 61 with an internal rib 62 dividing a first cavity 63 from a second cavity 64. The two chambers or cavities 63, 64 are able to store different items. The dispensing utensil 60 has two lids 65, 66 operatively associated with chambers 63, 64 respectively. The lids 65, 66 are formed in a similar manner to the single chamber utensil 10 as described above. Each lid 65, 66 may be opened separately so that the contents in the chambers 63, 64 respectively may be dispensed separately and without contamination from the other chamber. In order to achieve separate openings of the lids 65, 66, the pliable top wall 67 has an end split 68 separating each lid 65, 66.

Other embodiments may have additional chambers to accommodate different dispensable items.

Furthermore, other embodiments may have a stirring rod, knife blade or fork prongs instead of a spoon bowl. With the various embodiments the stored dispensable items preferably relate to the particular dispensing utensil. By way of example, a dispensing knife or dispensing fork may have stored salt, pepper or other condiments while a dispensing spoon may contain sugar, coffee, whitener, powdered chocolate or another suitable additive for a drink.

The preferred embodiment of the present invention provides the advantage that the utensil can be manufactured, filled and assembled relatively more easily and cheaply than tube-shaped dispensing utensils, as well as having increased functionality and ease of use for the consumer.

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims this specification the word "comprise" and variations of that word such as "comprises" and "comprising", are not intended to exclude other additives, components, integers or steps.

The invention claimed is:

1. A dispensing utensil comprising:
    a handle having a first end portion, a second end portion, and a frangible connection intermediate the first and second end portions;
    opposing sidewall portions of the first and second end portions of the handle;
    an elongate cavity defined by the opposing sidewall portions of the first and second end portions of the handle for storing dispensable contents therein;
    an upper surface of the opposing sidewall portions defining a first opening along the handle to allow for filling of the cavity initially;
    a cover affixed to the upper surface to close the first opening of the handle and seal the cavity;
    an implement extending from the handle;
    a step profile of one of the first and second end portions extending inwardly from the opposing sidewall portions thereof toward the frangible connection and restricting failure of the handle to failure along the frangible connection, which creates first and second frangible connection edges which can interact to re-close the handle and
    a hinge formed by at least the cover to provide a second opening when the frangible connection is severed by pivoting one of the first and second end portions using the hinge, thereby allowing the contents to be dispensed.

2. A dispensing utensil according to claim 1 wherein the cover is a pliable top wall.

3. A dispensing utensil according to claim 1 wherein the cover is paper, film, foil, or a laminate including paper, film or foil.

4. A dispensing utensil according to claim 1 wherein the handle defining the cavity comprises a thin walled plastic shell.

5. A dispensing utensil according to claim 1 wherein the first and second portions of the handle are integrally formed.

6. A dispensing utensil according to claim 1 wherein the frangible connection of the handle is distal from the implement.

7. A dispensing utensil according to claim 1 wherein the frangible connection of the handle is proximal the implement.

8. A dispensing utensil according to claim 1 further comprising a second cavity for storing dispensable contents.

9. A dispensing utensil according to claim 8 wherein dispensing of contents from the second cavity is independently operable in the same manner as the first cavity.

10. A dispensing utensil according to claim 1 wherein the handle includes a rest at one of the first and second end portions being curved inward relative to the elongate cavity to compliment in part curvature of a thumb to receive pressure from a thumb to cause failure of the frangible connection.

11. A dispensing utensil according to claim 1 further comprising the contents of the cavity.

12. A dispensing utensil according to claim 1 wherein the implement is selected from one of a stirrer, mixing paddle, spoon bowl, fork prongs, knife blade, chopstick, brush, tooth pick, floss pick, mop, tongs, tweezers, razor, trowel, spade, spatula, and comb.

13. A dispensing utensil according to claim 1 wherein the handle and implement are integrally formed.

14. The dispensing utensil according to claim 1 wherein the handle includes a friction fit engagement along the frangible connection for reclosing the second opening, the friction fit engagement includes said first frangible connection edge and said second frangible connection edge formed upon failure of the frangible connection, the friction fit engagement including the first frangible connection edge extending beyond the second frangible connection edge and at least partially into the elongate cavity upon reclose of the second opening.

15. The dispensing utensil of claim 1 wherein the frangible connection comprises a thin section of the handle.

16. A dispensing utensil shell comprising:
    a handle portion including a first wall;
    an implement portion;
    a cavity for storing dispensable contents defined by a generally U-shaped portion of the first wall of the handle portion;
    a generally flat surface of the first wall defining an opening of the cavity for filling the cavity;
    a generally planar second wall of the handle portion affixed to and overlapping at least a portion of the generally flat surface of the first wall for sealing the cavity;
    a proximal portion of the first wall adjacent the implement portion;
    a distal portion of the first wall adjacent a terminal end of the handle portion;
    a predetermined failure zone of the first wall between the proximal and distal portions thereof, the predetermined failure zone extending along substantially the entire U-shaped portion of the first wall of the handle portion such that the distal portion is shiftable about a hinge formed by at least the second wall relative to the proximal portion when the failure zone fails, thereby allowing the contents to be dispensed; and a step profile of the first wall disposed between the failure zone and one of the proximal and distal portions of the first wall, the step profile extending parallel to the failure zone along substantially the entire U-shaped portion of the first wall and directing failure of the first wall along the predetermined failure zone, wherein the failure of the failure zone creates two failure zone edges which can interact to re-close the handle.

17. The dispensing utensil shell of claim 16 wherein the handle includes a longitudinal axis thereof and the generally planar second wall extends generally parallel to the longitudinal axis of the handle.

18. A dispensing utensil comprising:

an implement;

an elongate body connected to the implement, the body having a proximal end portion and a distal end portion relative to the implement;

a wall of the body having a generally U-shaped cross section extending between the proximal and distal end portions and defining a cavity of the body for storing dispensable contents;

an opening of the body in communication with the cavity;

a flange of the body extending about the opening;

a cover affixed to the flange which closes the opening and seals the cavity;

a failure zone of the wall between the proximal and distal end portions of the body extending transverse to the length of the body with one of the proximal and distal end portions capable of shifting about a hinge formed by at least the cover when the failure zone fails, thereby allowing the contents of the cavity to be dispensed; and a friction fit reclose feature along the failure zone including a first edge and a second edge formed upon failure of the failure zone with the first edge extending beyond the second edge and at least partially into the cavity upon reclose of the cavity.

* * * * *